(12) United States Patent
Chen et al.

(10) Patent No.: US 6,811,680 B2
(45) Date of Patent: Nov. 2, 2004

(54) PLANARIZATION OF SUBSTRATES USING ELECTROCHEMICAL MECHANICAL POLISHING

(75) Inventors: Liang-Yuh Chen, Foster City, CA (US); Wei-Yung Hsu, Santa Clara, CA (US); Alain Duboust, Sunnyvale, CA (US); Ratson Morad, Palo Alto, CA (US); Daniel A. Carl, Pleasanton, CA (US)

(73) Assignee: Applied Materials Inc., Santa Clara, CA (US)

( * ) Notice: Subject to any disclaimer, the term of this patent is extended or adjusted under 35 U.S.C. 154(b) by 165 days.

(21) Appl. No.: 10/038,066

(22) Filed: Jan. 3, 2002

(65) Prior Publication Data

US 2002/0130049 A1 Sep. 19, 2002

Related U.S. Application Data

(60) Provisional application No. 60/275,874, filed on Mar. 14, 2001, provisional application No. 60/286,107, filed on Apr. 24, 2001, and provisional application No. 60/326,263, filed on Oct. 1, 2001.

(51) Int. Cl.[7] .............................................. B23H 5/06
(52) U.S. Cl. ....................................................... 205/662
(58) Field of Search ................................ 205/662, 663; 438/690, 691, 692, 693

(56) References Cited

U.S. PATENT DOCUMENTS

| | | | |
|---|---|---|---|
| 2,582,020 A | 1/1952 | Emery | 204/140.5 |
| 3,239,441 A | 3/1966 | Marsol | |
| 3,873,512 A | 3/1975 | Latanision | |
| 4,263,113 A | 4/1981 | Bernard | 204/146 |
| 4,663,005 A | 5/1987 | Edson | 204/129.85 |
| 4,666,683 A | 5/1987 | Brown et al. | |
| 4,793,895 A | 12/1988 | Kaanta et al. | 156/627 |
| 4,934,102 A | 6/1990 | Leach et al. | 51/50 R |
| 4,992,135 A | 2/1991 | Doan | |
| 5,002,645 A | 3/1991 | Eastland, Jr. et al. | |
| 5,096,550 A | 3/1992 | Mayer et al. | 204/129.1 |
| 5,114,548 A | 5/1992 | Rhoades | |
| 5,129,981 A | 7/1992 | Wang et al. | 156/628 |
| 5,209,816 A | 5/1993 | Yu et al. | |

(List continued on next page.)

FOREIGN PATENT DOCUMENTS

| | | | | |
|---|---|---|---|---|
| EP | 0 527 537 | 2/1993 | | |
| EP | 0 811 665 A3 | 12/1997 | | C09G/1/02 |

(List continued on next page.)

OTHER PUBLICATIONS

PCT Written Opinion for PCT/US03/06058, dated Feb. 13, 2004 (AMAT/5699–PC.02).

(List continued on next page.)

*Primary Examiner*—Roy King
*Assistant Examiner*—Harry D. Wilkins, III
(74) *Attorney, Agent, or Firm*—Moser Patterson & Sheridan

(57) ABSTRACT

A method and apparatus are provided for planarizing a material layer on a substrate. In one aspect, a method is provided for processing a substrate including forming a passivation layer on a substrate surface, polishing the substrate in an electrolyte solution, applying an anodic bias to the substrate surface, and removing material from at least a portion of the substrate surface. In another aspect, an apparatus is provided which includes a partial enclosure, polishing article, a cathode, a power source, a substrate carrier movably disposed above the polishing article, and a computer based controller to position a substrate in an electrolyte solution to form a passivation layer on a substrate surface, to polish the substrate in the electrolyte solution with the polishing article, and to apply an anodic bias to the substrate surface or polishing article to remove material from at least a portion of the substrate surface.

36 Claims, 19 Drawing Sheets

U.S. PATENT DOCUMENTS

| | | | |
|---|---|---|---|
| 5,217,586 A | 6/1993 | Datta et al. | 204/129.6 |
| 5,225,034 A | 7/1993 | Yu et al. | 156/636 |
| 5,256,565 A | 10/1993 | Bernhardt et al. | 437/228 |
| 5,340,370 A | 8/1994 | Cadien et al. | |
| 5,391,258 A | 2/1995 | Brancaleoni et al. | |
| 5,407,526 A | 4/1995 | Danielson et al. | |
| 5,534,106 A | 7/1996 | Cote et al. | 156/636.1 |
| 5,543,032 A | 8/1996 | Datta et al. | 205/670 |
| 5,567,300 A | 10/1996 | Datta et al. | 205/652 |
| 5,575,706 A | 11/1996 | Tsai et al. | 451/41 |
| 5,770,095 A | 6/1998 | Sasaki et al. | |
| 5,783,489 A | 7/1998 | Kaufman et al. | |
| 5,807,165 A | 9/1998 | Uzoh et al. | 451/41 |
| 5,846,882 A | 12/1998 | Birang | 438/692 |
| 5,866,051 A | 2/1999 | Lin et al. | |
| 5,880,003 A | 3/1999 | Hayashi | |
| 5,897,375 A | 4/1999 | Watts et al. | |
| 5,911,619 A | 6/1999 | Uzoh et al. | 451/5 |
| 5,954,997 A | 9/1999 | Kaufman et al. | |
| 6,001,730 A | 12/1999 | Farkas et al. | |
| 6,004,880 A | 12/1999 | Liu et al. | |
| 6,056,864 A | 5/2000 | Cheung | 205/222 |
| 6,063,306 A | 5/2000 | Kaufman et al. | |
| 6,066,030 A | 5/2000 | Uzoh | 451/41 |
| 6,066,864 A | 5/2000 | Cheung et al. | |
| 6,077,412 A | 6/2000 | Ting et al. | 205/143 |
| 6,083,840 A | 7/2000 | Mravic, et al. | |
| 6,090,239 A | 7/2000 | Liu et al. | |
| 6,096,652 A | 8/2000 | Watts et al. | |
| 6,099,604 A * | 8/2000 | Sandhu et al. | 51/307 |
| 6,103,096 A | 8/2000 | Datta et al. | 205/686 |
| 6,106,728 A | 8/2000 | Iida et al. | |
| 6,117,775 A | 9/2000 | Kondo et al. | |
| 6,117,783 A | 9/2000 | Small et al. | |
| 6,117,853 A | 9/2000 | Sakai et al. | |
| 6,126,853 A | 10/2000 | Kaufman et al. | |
| 6,143,155 A | 11/2000 | Adams et al. | 205/87 |
| 6,143,656 A | 11/2000 | Yang et al. | |
| 6,153,043 A | 11/2000 | Edelstein et al. | |
| 6,171,352 B1 | 1/2001 | Lee et al. | |
| 6,176,992 B1 | 1/2001 | Talieh | 205/87 |
| 6,190,237 B1 | 2/2001 | Huynh et al. | |
| 6,194,317 B1 | 2/2001 | Kaisaki et al. | 438/692 |
| 6,206,756 B1 | 3/2001 | Chopra et al. | |
| 6,217,416 B1 | 4/2001 | Kaufman et al. | |
| 6,218,305 B1 | 4/2001 | Hosali et al. | |
| 6,234,870 B1 | 5/2001 | Uzoh et al. | 451/8 |
| 6,238,592 B1 | 5/2001 | Hardy et al. | |
| 6,248,222 B1 | 6/2001 | Wang | 204/297.09 |
| 6,258,711 B1 | 7/2001 | Laursen | |
| 6,258,721 B1 | 7/2001 | Li et al. | |
| 6,273,786 B1 | 8/2001 | Chopra et al. | |
| 6,276,996 B1 | 8/2001 | Chopra | 451/41 |
| 6,303,049 B1 | 10/2001 | Lee et al. | |
| 6,303,551 B1 | 10/2001 | Li et al. | |
| 6,310,019 B1 | 10/2001 | Kakizawa et al. | |
| 6,315,803 B1 | 11/2001 | Ina et al. | |
| 6,315,883 B1 * | 11/2001 | Mayer et al. | 205/123 |
| 6,348,076 B1 | 2/2002 | Canaperi et al. | 51/309 |
| 6,354,916 B1 | 3/2002 | Uzoh et al. | |
| 6,355,075 B1 | 3/2002 | Ina et al. | |
| 6,355,153 B1 | 3/2002 | Uzoh et al. | |
| 6,375,693 B1 | 4/2002 | Cote et al. | |
| 6,391,166 B1 | 5/2002 | Wang | |
| 6,395,152 B1 | 5/2002 | Wang | |
| 6,416,685 B1 | 7/2002 | Zhang et al. | |
| 6,419,554 B2 | 7/2002 | Chopra et al. | |
| 6,428,721 B1 | 8/2002 | Ina et al. | |
| 6,429,133 B1 | 8/2002 | Chopra | |
| 6,440,186 B1 | 8/2002 | Sakai et al. | |
| 6,440,295 B1 | 8/2002 | Wang | |
| 6,447,371 B2 | 9/2002 | Brusic Kaufman et al. | |
| 6,454,819 B1 | 9/2002 | Yano et al. | |
| 6,455,479 B1 | 9/2002 | Sahbari | |
| 6,508,952 B1 | 1/2003 | Lee et al. | |
| 6,551,935 B1 | 4/2003 | Sinha et al. | |
| 6,555,158 B1 | 4/2003 | Yoshio et al. | |
| 6,562,719 B2 | 5/2003 | Kondo et al. | |
| 6,565,619 B1 | 5/2003 | Asano et al. | |
| 6,579,153 B2 | 6/2003 | Uchikura et al. | |
| 6,593,239 B2 | 7/2003 | Kaufman et al. | |
| 6,596,638 B1 | 7/2003 | Kondo et al. | |
| 6,602,112 B2 | 8/2003 | Tran et al. | |
| 6,605,537 B2 | 8/2003 | Bian et al. | |
| 6,616,976 B2 | 9/2003 | Montano et al. | |
| 6,620,215 B2 | 9/2003 | Li et al. | |
| 6,676,484 B2 | 1/2004 | Chopra | |
| 6,679,928 B2 | 1/2004 | Costas et al. | |
| 6,679,929 B2 | 1/2004 | Asano et al. | |
| 6,693,036 B1 | 2/2004 | Nogami et al. | |
| 2001/0024878 A1 | 9/2001 | Nakamura | 438/691 |
| 2001/0036746 A1 | 11/2001 | Sato et al. | 438/745 |
| 2001/0042690 A1 | 11/2001 | Talieh | 205/118 |
| 2002/0006035 A1 | 1/2002 | Wang | |
| 2002/0016272 A1 | 2/2002 | Kakizawa et al. | |
| 2002/0040100 A1 | 4/2002 | Kume et al. | |
| 2002/0070126 A1 | 6/2002 | Sato et al. | |
| 2002/0072309 A1 | 6/2002 | Sato et al. | |
| 2002/0074230 A1 | 6/2002 | Basol | |
| 2002/0088709 A1 | 7/2002 | Hongo et al. | |
| 2002/0096659 A1 | 7/2002 | Sakai et al. | |
| 2002/0108861 A1 | 8/2002 | Emesh, et al. | |
| 2002/0139055 A1 | 10/2002 | Asano et al. | |
| 2002/0160698 A1 | 10/2002 | Sato et al. | |
| 2003/0073386 A1 | 4/2003 | Ma et al. | |
| 2003/0079415 A1 | 5/2003 | Ma et al. | |
| 2003/0083214 A1 | 5/2003 | Kakizawa et al. | |
| 2003/0104762 A1 | 6/2003 | Sato et al. | |
| 2003/0113996 A1 | 6/2003 | Nogami et al. | |
| 2003/0114004 A1 | 6/2003 | Sato et al. | |
| 2003/0116445 A1 | 6/2003 | Sun et al. | |
| 2003/0136055 A1 | 7/2003 | Li et al. | |
| 2003/0159184 A1 | 8/2003 | Wang et al. | |
| 2003/0170091 A1 | 9/2003 | Shomier et al. | |

FOREIGN PATENT DOCUMENTS

| | | | |
|---|---|---|---|
| EP | 0 846 842 A2 | 6/1998 | C09G/1/02 |
| EP | 1 170 761 | 3/2000 | |
| EP | 1 103 346 A2 | 5/2001 | B24B/37/04 |
| EP | 1 170 761 A1 | 9/2002 | H01G/9/035 |
| JP | P2001-77117 A | 3/2001 | H01L/21/3205 |
| SU | 1 618 538 A1 | 1/1991 | B23H/5/06 |
| WO | 98/04646 | 2/1998 | C09K/13/00 |
| WO | 98/49723 | 11/1998 | H01L/21/321 |
| WO | WO 99/46081 A1 | 9/1999 | |
| WO | 99/53532 | 10/1999 | H01L/21/00 |
| WO | 99/65072 | 12/1999 | H01L/21/321 |
| WO | 00/26443 | 5/2000 | |
| WO | 00 55876 A1 | 9/2000 | H01G/9/035 |
| WO | 07/7241 A2 | 10/2001 | C09G/1/00 |
| WO | WO 02/23616 A1 | 3/2002 | |
| WO | WO 02-075804 | 9/2002 | |
| WO | 02 075804 A2 | 9/2002 | H01L/21/321 |
| WO | WO 02/88229 A1 | 11/2002 | |
| WO | WO 03/060962 A2 | 7/2003 | |

OTHER PUBLICATIONS

PCT Written Opinion for PCT/US02/04806, dated Mar. 9, 2004 (AMAT/5699.PC).

Nogami, "*An Innovation To Integrate Porous Low–K Materials And Copper*", *InterConnect Japan 2001*; Honeywell Seminar (Dec. 6, 2001) pp. 1–12.

D. Landolt, "Fundamental Aspects of Electropolishing", Mar. 18, 1996 pp. 1–11.

Robert J. Contolini, "Electrochemical Planarization of ULSI Copper" Jun. 1997, Solid State Technology, pp. 155–156, 158, 160.

* cited by examiner

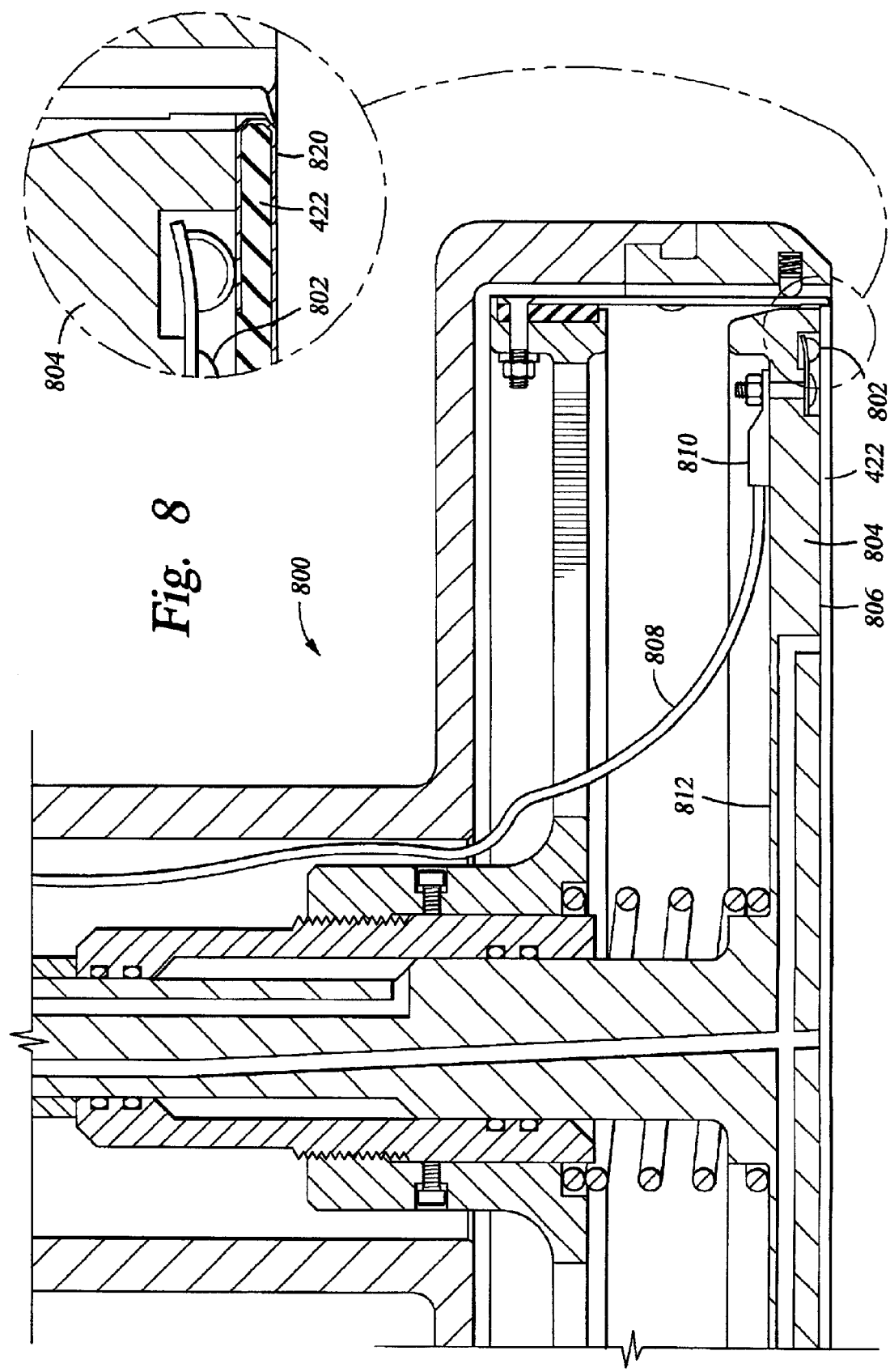

PLANARIZATION OF SUBSTRATES USING ELECTROCHEMICAL MECHANICAL POLISHING

CROSS-REFERENCE TO RELATED APPLICATIONS

This application claims benefit of U.S. Provisional Patent Application Ser. No. 60/275,874, filed on Mar. 14, 2001, U.S. Provisional Patent Application Ser. No. 60/286,107, filed on Apr. 24, 2001, and U.S. Provisional Patent Application Ser. No. 60/326,263, filed Oct. 1, 2001, each of which are incorporated herein by reference.

BACKGROUND OF THE INVENTION

1. Field of the Invention

The present invention relates to an apparatus and method for planarization of a material, such as a metal, on a substrate.

2. Background of the Related Art

Sub-quarter micron multi-level metallization is one of the key technologies for the next generation of ultra large-scale integration (ULSI). The multilevel interconnects that lie at the heart of this technology require planarization of interconnect features formed in high aspect ratio apertures, including contacts, vias, lines and other features. Reliable formation of these interconnect features is very important to the success of ULSI and to the continued effort to increase circuit density and quality on individual substrates and die.

In the fabrication of integrated circuits and other electronic devices, multiple layers of conducting, semiconducting, and dielectric materials are deposited on or removed from a surface of a substrate. Thin layers of conducting, semiconducting, and dielectric materials may be deposited by a number of deposition techniques. Common deposition techniques in modern processing include physical vapor deposition (PVD), also known as sputtering, chemical vapor deposition (CVD), plasma-enhanced chemical vapor deposition (PECVD), and now electrochemical plating (ECP).

As layers of materials are sequentially deposited and removed, the uppermost surface of the substrate may become non-planar across its surface and require planarization. Planarizing a surface, or "polishing" a surface, is a process where material is removed from the surface of the substrate to form a generally even, planar surface. Planarization is useful in removing undesired surface topography and surface defects, such as rough surfaces, agglomerated materials, crystal lattice damage, scratches, and contaminated layers or materials. Planarization is also useful in forming features on a substrate by removing excess deposited material used to fill the features and to provide an even surface for subsequent levels of metallization and processing.

Chemical mechanical planarization, or chemical mechanical polishing (CMP), is a common technique used to planarize substrates. CMP utilizes a chemical composition, typically a slurry or other fluid medium, for selective removal of material from substrates. In conventional CMP techniques, a substrate carrier or polishing head is mounted on a carrier assembly and positioned in contact with a polishing pad in a CMP apparatus. The carrier assembly provides a controllable pressure to the substrate urging the substrate against the polishing pad. The pad is moved relative to the substrate by an external driving force. The CMP apparatus effects polishing or rubbing movement between the surface of the substrate and the polishing pad while dispersing a polishing composition, or slurry, to effect chemical activity and/or mechanical activity and consequential removal of material from the surface of the substrate.

Copper is becoming a metal of choice in ULSI to form interconnects that provide the conductive pathway in integrated circuits and other electronic devices. Copper is a material having advantageous properties such as lower resistance and better electromigration performance compared to traditional materials such as aluminum. Copper can be deposited by various techniques such as PVD, CVD and electroplating. Electroplating (ECP) is seen as a low cost and effective deposition technique with promise. ECP is performed by introducing a substrate into a plating bath and applying a current to the substrate. The copper ions plate out of solution and deposit onto the substrate.

However, copper is difficult to pattern and etch. Accordingly, copper features are formed using damascene or dual damascene processes. In damascene processes, a feature is defined in a dielectric material and subsequently filled with copper. A barrier layer is deposited conformally on the surfaces of the features formed in the dielectric layer prior to deposition of the copper. Copper is then deposited over the barrier layer and the surrounding field. The copper deposited on the field is removed by CMP processes to leave the copper filled feature formed in the dielectric material. Both abrasive and abrasive free CMP processes are available and others are being developed to remove copper. Abrasives refer to particulate material, such as alumina or silica, added to the polishing slurry or released from a fixed-abrasive polishing pad during polishing which provide mechanical abrasion to a substrate surface being polished.

Additionally, substrate surfaces may have different surface topography, depending on the density or size of features formed therein, which makes effective conformal removal of copper material from the substrate surface difficult to achieve. For example, it has been observed that copper material is removed from a dense feature area of the substrate surface at a slower removal rate as compared to removing copper material from a substrate surface area having few, if any, features formed therein. Additionally, the relatively uneven removal rates can result in underpolishing of areas of the substrate with residual copper material remaining after the polishing process.

One solution to removing all of the desired copper material from the substrate surface is overpolishing the substrate surface. However, overpolishing of some materials can result in the formation of topographical defects, such as concavities or depressions in features, referred to as dishing, or excessive removal of dielectric material, referred to as erosion. The topographical defects from dishing and erosion can further lead to non-uniform removal of additional materials, such as barrier layer materials disposed thereunder, and produce a substrate surface having a less than desirable polishing quality.

Another problem with the polishing of copper surfaces arises from the use of low dielectric constant (low k) dielectric materials to form copper damascenes in the substrate surface. Low k dielectric materials, such as carbon doped silicon oxides, may deform or scratch under conventional polishing pressures (i.e., about 6 psi), called downforce, which can detrimentally affect substrate polish quality and detrimentally affect device formation. For example, rotational relative movement between the substrate and a polishing pad can induce a shear force along the substrate surface and deform the low k material to form topographical defects, such as scratches, which can detrimentally affect subsequent polishing.

As a result, there is a need for an apparatus and method for depositing and planarizing a metal layer, such as a copper layer, on a substrate.

SUMMARY OF THE INVENTION

Aspects of the invention generally provide methods and apparatus for planarizing a substrate surface with reduced contact pressure between a substrate and a polishing apparatus. In one aspect, a method is provided for processing a substrate including positioning the substrate in an electrolyte solution comprising a corrosion inhibitor, forming a passivation layer on a substrate surface, polishing the substrate in the electrolyte solution, applying an anodic bias to the substrate surface, and removing material from at least a portion of the substrate surface.

In another aspect, a method is provided for processing a substrate including positioning the substrate in an electrolyte solution adjacent polishing article, the electrolyte including a corrosion inhibitor, a leveling agent, a viscous forming agent, or combinations thereof, to form a current suppressing layer on a substrate surface, polishing the substrate in the electrolyte solution with the polishing article to remove at least a portion of the current suppressing layer, applying a bias between an anode and a cathode disposed in the electrolyte solution, and removing material from at least a portion of the substrate surface with anodic dissolution.

In another aspect, an apparatus is provided for processing substrates including a partial enclosure defining a processing region and having a fluid inlet and a fluid outlet, an cathode disposed in the partial enclosure, polishing article disposed in the partial enclosure, a substrate carrier movably disposed above the polishing article, the substrate carrier having a substrate mounting surface, a power source connected to at least the partial enclosure, and a computer based controller configured to cause the apparatus to position a substrate in an electrolyte solution to form a passivation layer on a substrate surface, to polish the substrate in the electrolyte solution with the polishing article, and to apply an anodic bias to the substrate surface or polishing article to remove material from at least a portion of the substrate surface.

In another aspect, an electrochemical deposition system is provided that includes a mainframe having a mainframe wafer transfer robot, a loading station disposed in connection with the mainframe, one or more electrochemical processing cells disposed in connection with the mainframe, one or more polishing platens disposed in connection with the mainframe, an electrolyte supply fluidly connected to the one or more electrochemical processing cells, and one or more polishing fluid supplies connected to the one or more.

BRIEF DESCRIPTION OF THE DRAWINGS

So that the manner in which the above recited features described herein are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 8 depicts a partial view of another embodiment of a carrier head assembly;

DETAILED DESCRIPTION OF THE PREFERRED EMBODIMENT

In general, aspects of the invention provide apparatus and methods for planarizing a substrate surface with reduced contact pressure between a substrate and a polishing apparatus. The invention will be described below in reference to a planarizing process for the removal of conductive materials, such as copper and other copper containing materials from a substrate surface by electrochemical mechanical polishing (ECMP) techniques.

Figure 2:
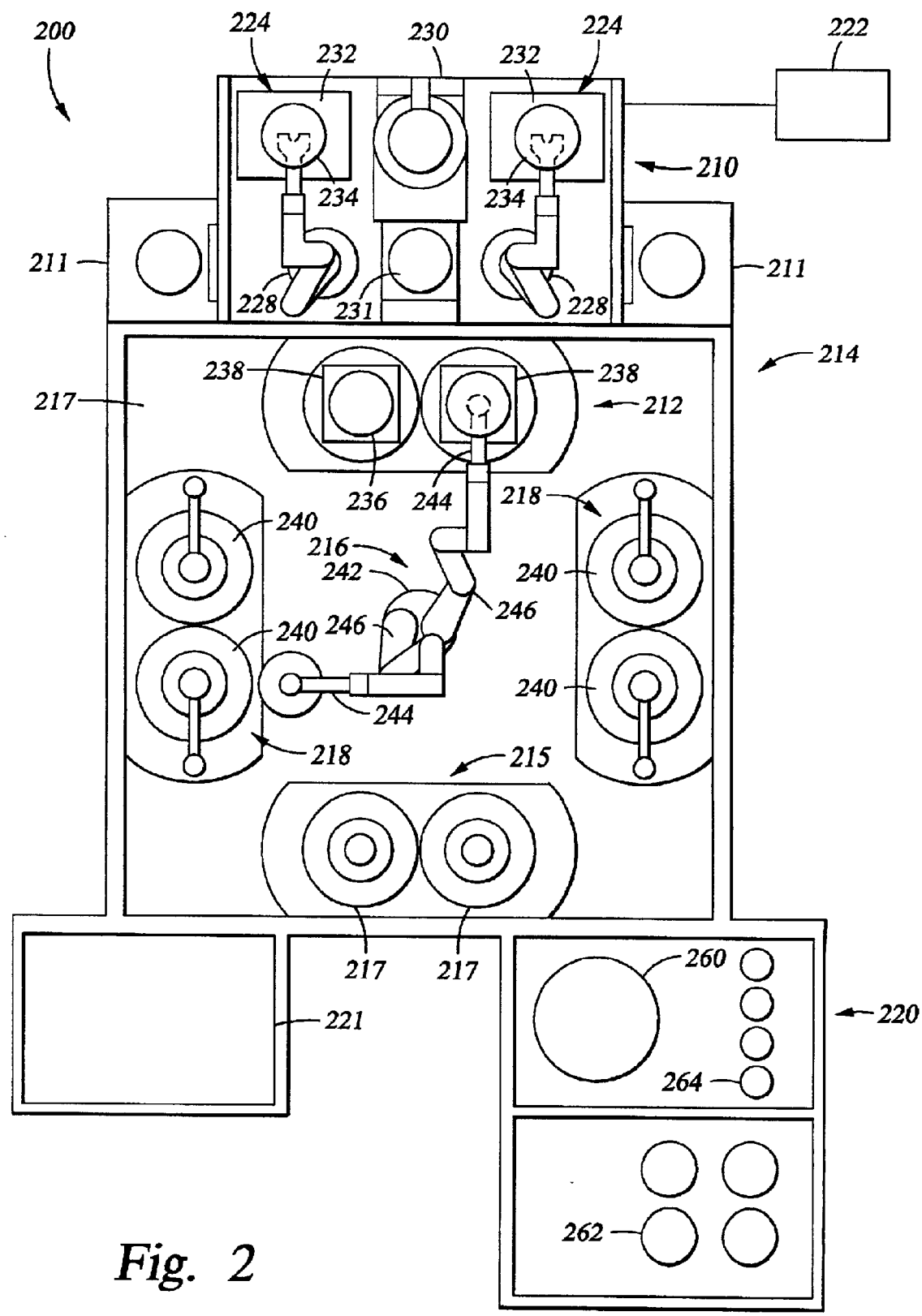
FIG. 2 is a schematic top view of one embodiment of an electroplating system.
Figure 3:
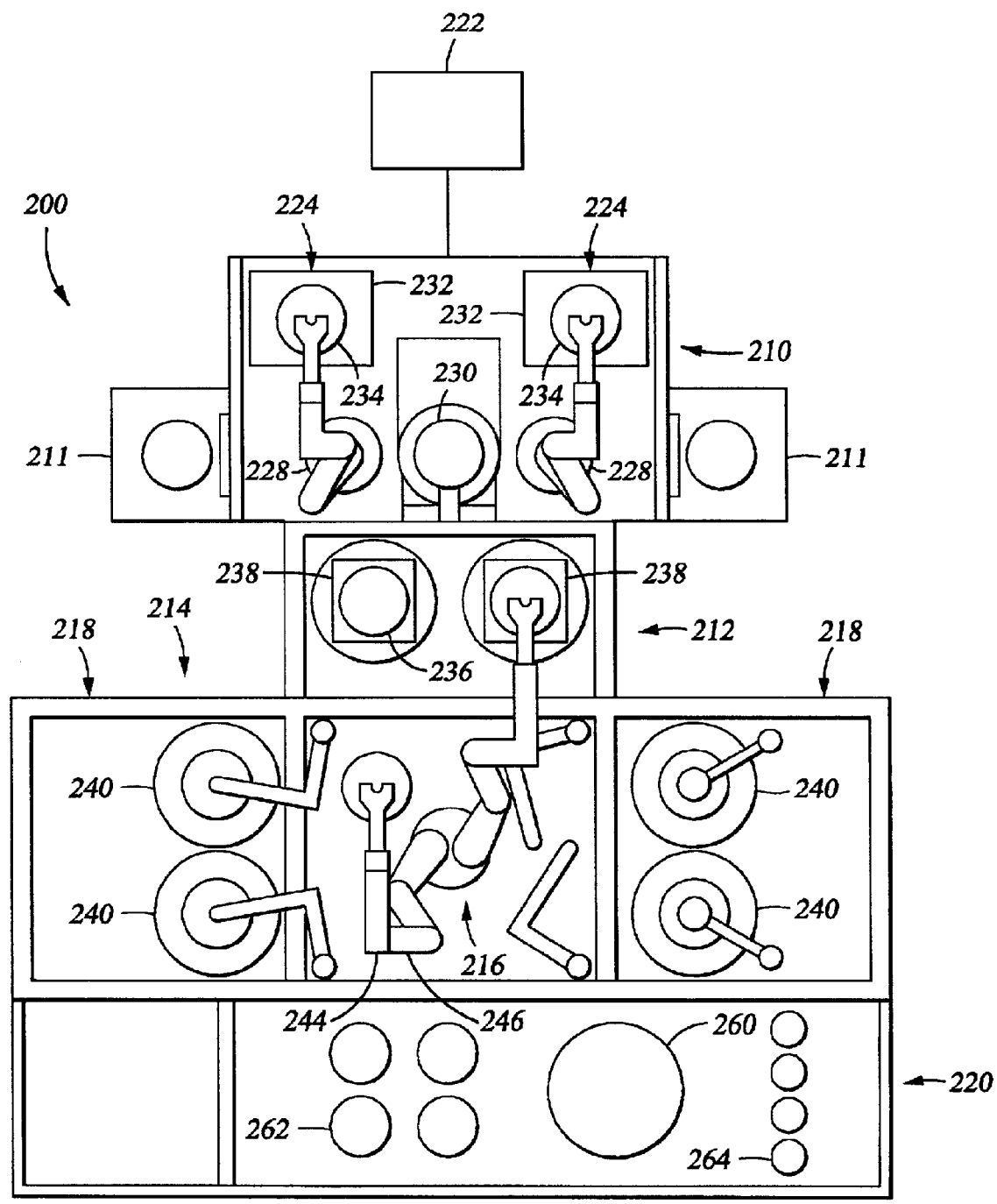
FIG. 3 is a schematic top view of another embodiment of an electroplating system.

The words and phrases used herein should be given their ordinary and customary meaning in the art by one skilled in the art unless otherwise further defined. Chemical-mechanical polishing should be broadly construed and includes, but is not limited to, abrading a substrate surface by chemical activity, mechanical activity, or a combination of both chemical and mechanical activity. Electropolishing should be broadly construed and includes, but is not limited to, removing material from a substrate by the application of electrochemical activity, such as by anodic dissolution. Anodic dissolution is broadly described herein as the application of an anodic bias to a substrate surface or conductive object in contact with the substrate surface that results in the transfer of conductive material from a substrate surface into a surrounding conductive fluid. Electrochemical mechanical polishing (ECMP) is broadly defined herein as planarizing a substrate by the application of electrochemical activity, chemical activity, mechanical activity, or a combination of electrochemical, chemical, and mechanical activity to remove material from a substrate surface. Exemplary processing systems that may be used to perform processes described herein are shown in FIGS. 1–3.

Figure 1:
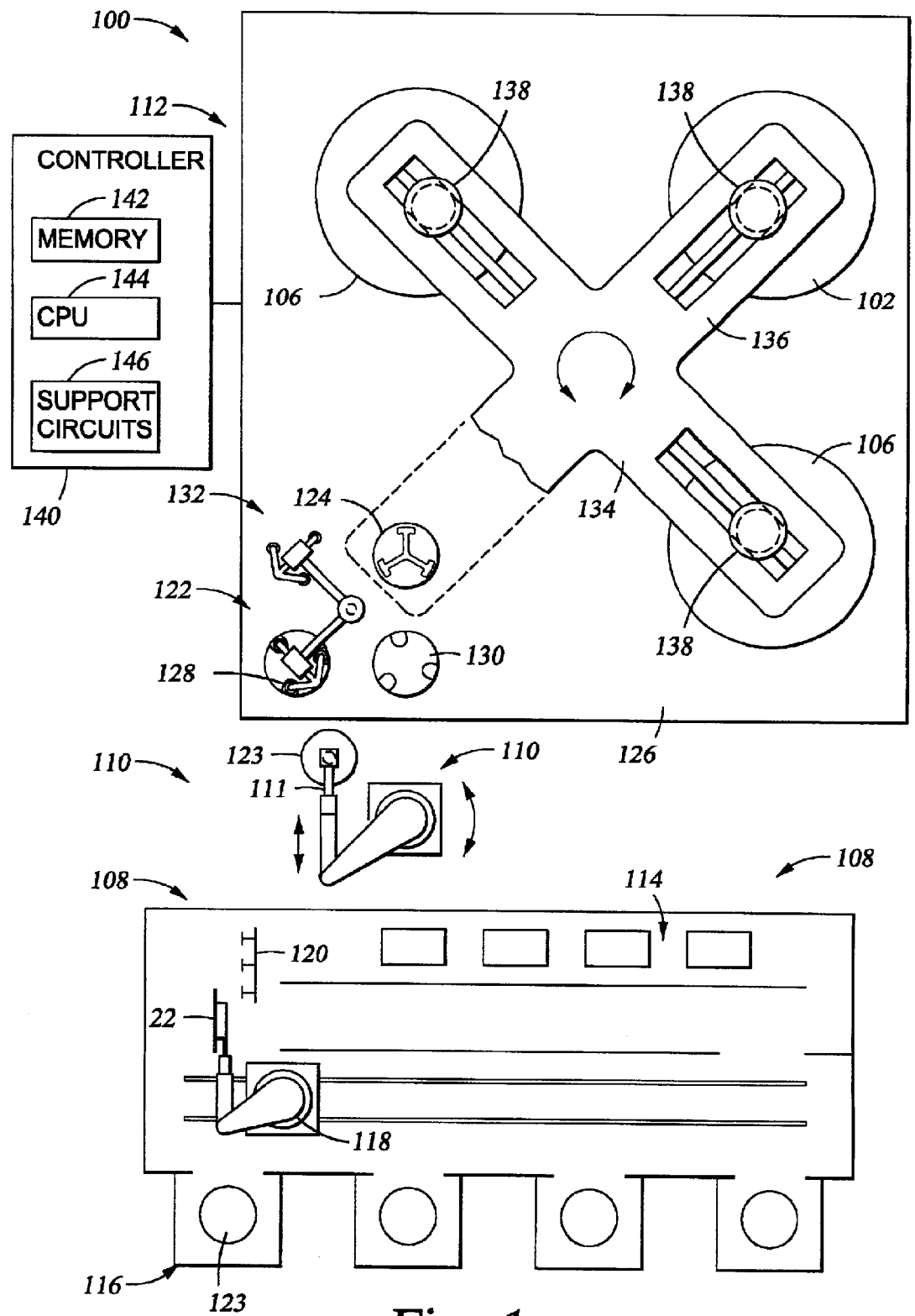
FIG. 1 is a plan view of one embodiment of a processing system incorporating embodiments of the processing apparatus of the invention.

FIG. 1 depicts one embodiment of a processing system 100 for performing the processes described herein. One polishing tool that may be adapted to benefit from the invention is a Mirra® Mesa™ chemical mechanical polisher available from Applied Materials, Inc. located in Santa Clara, Calif. The exemplary system 100 generally comprises a factory interface 108, a loading robot 110, and a processing module 112 having at least one electrochemical processing station 102 and at least one conventional polishing station 106 disposed thereon.

Generally, the loading robot 110 is disposed proximate the factory interface 108 and the processing module 112 to facilitate the transfer of substrates 122 therebetween. The factory interface 108 generally includes a cleaning module 114 and one or more substrate cassettes 116. An interface robot 118 is employed to transfer substrates 123 between the substrate cassettes 116, the cleaning module 114 and an input module 120. The input module 120 is positioned to facilitate transfer of substrates 123 between the processing module 112 and the factory interface 108 by the loading robot 110. An example of a factory interface that may be used to advantage is disclosed in U.S. patent application Ser. No. 09/547,189, filed Apr. 11, 2000, which has issued as U.S. Pat. No. 6,361,422, issued Mar. 26, 2003, and is assigned to common assignee Applied Materials, Inc., and which is hereby incorporated by reference.

The loading robot 110 is generally positioned proximate the factory interface 108 and the processing module 112 such that the range of motion provided by the robot 110 facilitates transfer of the substrates 123 therebetween. An example of a loading robot 110 is a 4-Link robot, manufactured by Kensington Laboratories, Inc., located in Richmond, Calif. The exemplary loading robot 110 has a gripper 111 that may orientate the substrate 123 in either a vertical or a horizontal orientation.

In one embodiment shown in FIG. 1, an exemplary processing module 112 has a transfer station 122 and a carousel 134 in addition to the electrochemical processing station 102 and the polishing station 106, all of which are disposed on a machine base 126. The processing module 112 may comprise one or more processing stations, of which each station 102, 106 of the module 112 may be adapted to perform electrochemical processing, such as electrodeposition and electropolishing, and conventional chemical, mechanical polishing processing, or combinations thereof. Each polishing station 106 may comprise a stationary polishing platen, a rotatable polishing platen, a linear polishing platen, a rotatable linear polishing platen, a roller polishing platen, or combinations thereof. Polishing article disposed in the polishing station 106 may be conductive and/or contain abrasive elements or particles.

In one embodiment, the transfer station 122 comprises at least an input buffer station 128, an output buffer station 130, a transfer robot 132, and a load cup assembly 124. The transfer robot 132 has two gripper assemblies, each having pneumatic gripper fingers that grab the substrate 123 by the substrate's edge. The transfer robot 132 lifts the substrate 123 from the input buffer station 128 and rotates the gripper and substrate 123 to position the substrate 123 over the load cup assembly 134, then places the substrate 123 down onto the load cup assembly 124. An example of a transfer station that may be used to advantage is described by Tobin in U.S. patent application Ser. No. 09/414,771, filed Oct. 6, 1999, which has issued as U.S. Pat. No. 6,156,124, issued Dec. 5, 2000, and is assigned to common assignee Applied Materials, Inc., and which is hereby incorporated by reference.

The carousel 134 is generally described in U.S. Pat. No. 5,804,507, issued Sep. 8, 1998 to Tolles et al. and is hereby incorporated herein by reference in its entirety. Generally, the carousel 134 is centrally disposed on the base 126. The carousel 134 typically includes a plurality of arms 136. Each arm support a carrier head assembly, or polishing head, 138. One of the arms 136 depicted in FIG. 1 is shown in phantom such that the transfer station 122 may be seen. The carousel 134 is indexable such that the polishing head 138 may be moved between the modules 102, 106 and the transfer station 122.

Generally the polishing head 138 retains the substrate 123 while pressing the substrate against a polishing material (not shown) disposed on the polishing stations 106. One polishing head that may be utilized is a Titan Head™ substrate carrier manufactured by Applied Materials, Inc., Santa Clara, Calif.

Further, while not shown, a computer system or computer based controller or a computer program-product may be connected to the system 100 for instructing the system to perform one or more processing steps on the system, such as mechanically polishing a substrate surface, electrochemically removing material from a substrate, or transferring a substrate in the system 100. Alternatively, if electrochemical deposition or concurrent electrochemical deposition and electropolishing are practiced, the computer system, computer based controller, or computer program-product may be adapted to also perform those steps.

To facilitate control of the system 100 as described above, computer based controller 140 may be a CPU 144 or one of any form of computer processor that can be used in an industrial setting for controlling various chambers and sub-processors. Memory 142 is coupled to the CPU 144 and the memory, or computer-readable medium, may be one or more of readily available memory such as random access memory (RAM), read only memory (ROM), floppy disk, hard disk, or any other form of digital storage, local or remote. Support circuits 146 are coupled to the CPU 144 for supporting the processor in a conventional manner. These circuits include cache, power supplies, clock circuits, input/output circuitry and subsystems, and the like. Process sequences, such as by aspects of the processes described herein, is generally stored in the memory, typically as a software routine. The software routine may also be stored and/or executed by a second CPU (not shown) that is remotely located from the hardware being controlled by the CPU 144.

FIG. 2 depicts a schematic top view of another embodiment of a processing system 200 having at least one electrochemical processing station 218 and at least one conventional polishing station 215 for performing the processes described herein. One tool that may be adapted to benefit from the invention is an electrochemical processing platform or system, such as an Electra® processing system available from Applied Materials, Inc. located in Santa Clara, Calif.

The system 200 includes a loading station 210 and a mainframe 214. The mainframe 214 generally includes a mainframe transfer station 216, a spin-rinse dry (SRD) station 212, one or more electrochemical processing stations 218, and one or more polishing stations 215. The system 200 may also include a thermal anneal chamber, such as a rapid thermal anneal (RTA) chamber 211, an electrolyte replenishing system 220, and one or more substrate pass-through cassettes 238.

Each electrochemical processing station 218 includes one or more electrochemical processing cells 240. The electrolyte replenishing system 220 is positioned adjacent the mainframe 214 and connected to the process cells 240 individually to circulate electrolyte used for the electroplating process. Each polishing station 215 includes one or more polishing platens 217. The polishing platens 217 may include a stationary polishing platen, a rotatable polishing platen, a linear polishing platen, a rotatable linear polishing platen, a roller containing platen or cell as described herein, or combinations thereof, with a polishing articles disposed on or in the platen. Polishing article disposed on the polishing platens 217 may be conductive and/or contain abrasive elements or particles.

The system 200 also includes a power supply station 221 for providing electrical power to the system and a control system 222. The power supply station 221 includes one or more power sources which may be connected to individual electrochemical cells 240 and polishing platens 217. The control system 222 includes a programmable microprocessor with a computer-readable medium, i.e., software, designed specifically for controlling all components of the system 200 and coordinating the operations of the various components of the system 200. The control system 222 may also control electrical power provided to the components of the system. The control system 222 may also includes a control panel that allows an operator to monitor and operate the system 200. The control panel is a stand-alone module that is connected to the control system 222 through a cable and provides easy access to an operator.

The loading station 210 preferably includes one or more substrate cassette receiving areas 224, one or more loading station transfer robots 228 and at least one substrate orientor 230. A number of substrate cassette receiving areas, loading station transfer robots 228 and substrate orientor included in the loading station 210 can be configured according to the desired throughput of the system. As shown in FIG. 2, the loading station 210 in one embodiment includes two substrate cassette receiving areas 224, two loading station transfer robots 228 and one substrate orientor 230. A substrate cassette 232 containing substrates 234 is loaded onto the substrate cassette receiving area 224 to introduce substrates 234 into the system 200. The loading station transfer robot 228 transfers substrates 234 between the substrate cassette 232 and the substrate orientor 230.

The substrate orientor 230 positions each substrate 234 in a desired orientation to ensure that the substrate is properly processed. The loading station transfer robot 228 also transfers substrates 234 between the loading station 210 and the SRD station 212 and between the loading station 210 and the thermal anneal chamber 211. The loading station 210 preferably also includes a substrate cassette 231 for temporary storage of substrates as needed to facilitate efficient transfer of substrates through the system.

FIG. 2 also shows a mainframe transfer robot 242 having a flipper robot 244 incorporated therein to transfer substrates between different stations attached to the mainframe station. The mainframe transfer robot 242 includes a plurality of robot arms 242 (two shown), and a flipper robot 244 is attached as an end effector for each of the robot arms 246 capable of transferring substrates between different stations attached to the mainframe as well as flipping the substrate being transferred to the desired surface orientation. For example, the flipper robot 244 flips the substrate processing surface face-down for the electrochemical processes in the processing cell 240 or polishing process in the polishing platens 217, and flips the substrate processing surface face-up for other processes, such as the spin-rinse-dry process or substrate transfer.

Flipper robots are generally known in the art and can be attached as end effectors for substrate handling robots, such as model RR701, available from Rorze Automation, Inc., located in Milpitas, Calif. The flipper robot 244 may also be adapted for use with electrochemical processing cells 240 to electroplate a substrate disposed on a flipper or the electrochemical processing cell 240 may be adapted to receive a substrate from a flipper robot prior to processing in the cell 240.

Alternatively, a substrate carrier (as shown in FIG. 1) may be disposed in place of the mainframe transfer robot 242 to transfer between and/or process substrates in the one or more electrochemical processing stations 218 and the one or more polishing stations 215.

The rapid thermal anneal (RTA) chamber 211 is preferably connected to the loading station 210, and substrates are transferred into and out of the RTA chamber 211 by the loading station transfer robot 228. The electroplating system as shown in FIG. 2 includes two RTA chambers 211 disposed on opposing sides of the loading station 210, corresponding to the symmetric design of the loading station 210, in one embodiment. An example of a suitable anneal chamber is a rapid thermal anneal chamber, such as the RTP XEplus Centura® thermal processor available from Applied Materials, Inc., Santa Clara, Calif.

The electrolyte replenishing system 220 provides the electrolyte to the electroplating process cells 240 for the electroplating and/or anodic dissolution process. The electrolyte replenishing system 220 generally comprises a main electrolyte tank 260, a plurality of source tanks 262, and a plurality of filter tanks 264. One or more controllers control the composition of the electrolyte in the main tank 260 and the operation of the electrolyte replenishing system 220. Preferably, the controllers are independently operable but integrated with the control system 222 of the system 200.

The main electrolyte tank 260 provides a reservoir for electrolyte and includes an electrolyte supply line that is connected to each of the electroplating process cells. The source tanks 262 contain the chemicals needed for composing the electrolyte and typically include a deionized water source tank and copper sulfate ($CuSO_4$) source tank for composing the electrolyte. Other source tanks 262 may contain hydrogen sulfate ($H_2SO_4$), hydrogen chloride (HCl), hydrogen phosphate ($H_2PO_4$), and/or various additives including corrosion inhibitors and leveling agents, such as polyglycols. Examples of electrolyte solution and additives for use in the electrolyte tank 260 and source tanks 262 are further described herein.

Additionally, while not shown, one or more supply tanks are connected to system 200 to provide one or more polishing fluids, conditioning fluids, and/or cleaning fluids, to the one or more polishing stations 215 disposed thereon.

The system 200 has a modular design that allows for the replacement of components for a desired configuration for performing a process or sequence of processes. For example, the electrochemical processing stations 218 may be replaced with polishing stations 215, and vice versa.

Additionally, individual components of the stations, such as the one or more polishing platens 217 of the polishing stations 215, may be disposed at the locations of other processing components, such as the thermal anneal chamber 211 and one or more substrate pass-through cassettes 238. Alternative embodiments of the system 200 may include electroless deposition stations at the location of the one or more polishing stations 215. For example if the one or more polishing platens 217 are alternatively disposed at the locations of the thermal anneal chamber 211 or the one or more substrate pass-through cassettes 238, electroless deposition stations may be disposed at the location where the one or more polishing stations 215 are disposed in FIG. 2.

Another system useful for performing the processes described herein is shown in FIG. 3. FIG. 3 depicts a schematic top view of another embodiment of a processing system 200 having at least one electrochemical processing station 218 and at least one conventional polishing station 212 for performing the processes described herein. The system 200 generally comprises a loading station 210, a mainframe 214, one or more electrochemical processing cells 240 disposed at the processing stations 218, and one or more polishing platens 238 disposed at the polishing stations 212.

The system may also contain a thermal anneal chamber 211 and an electrolyte replenishing system 220. The mainframe 214 generally comprises a mainframe transfer station 216 and a plurality of processing stations 218 with the polishing station 212 connected between the mainframe 214 and the loading station 210. In the embodiment shown in FIG. 3, the system 200 includes two anneal chambers 211, two substrate cassette receiving areas 224, two loading station transfer robots 228, one wafer orientor 230, two polishing platens 238, and four electroplating cells 240.

In an alternative embodiment of the system 200 shown in FIG. 3, a spin-rinse-dry (SRD) station or one or more substrate pass-through cassettes may be disposed at the locations of the one or more polishing platens 238. The alternative embodiment may have one or more polishing platens disposed at the location of the thermal anneal chambers 211 if the alternative tool configuration.

Figure 4:
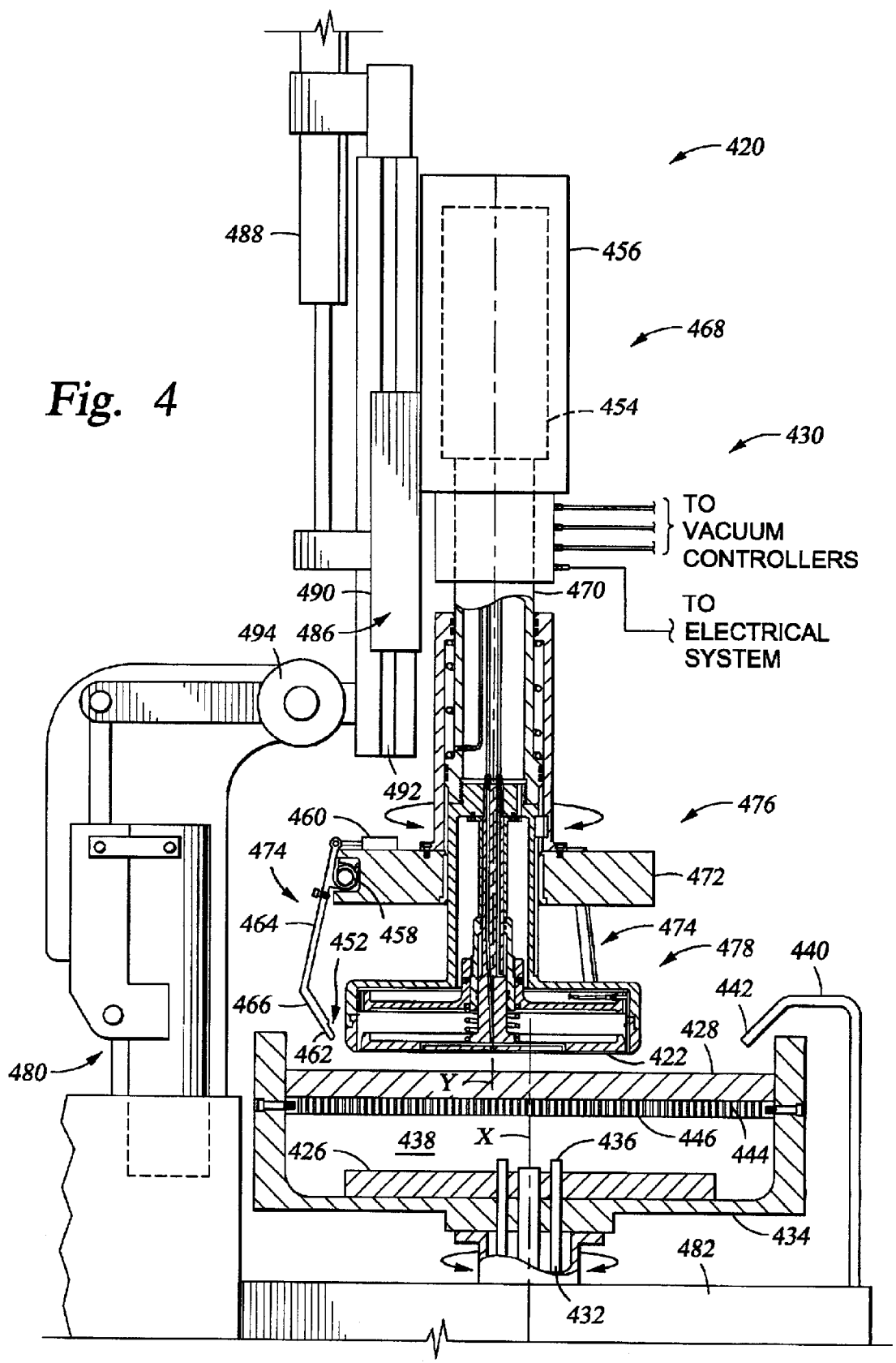
FIG. 4 is a cross sectional view of one embodiment of a processing apparatus of the invention showing a substrate disposed above a permeable disk.

FIG. 4 is a cross sectional view of one embodiment of an apparatus 420 for depositing and planarizing a metal layer on a substrate 422 useful in processing system shown in FIGS. 2 and 3, for example, Modifications of a mounting assembly for the carrier assembly 430 can be effectuated to utilize this assembly in the processing system 200 of FIG. 1. Namely, the carrier is mounted in a carousel.

The apparatus 420 generally includes a carrier assembly 430 movably supported by a stanchion 480 over a partial enclosure 434. The stanchion 480 and enclosure 434 are generally disposed on a common base 482. The stanchion 480 generally includes a base support 484 and a lift mechanism 486. The base support 484 extends perpendicularly from the base 482 and may be rotatable on its axis so that the carrier assembly 430 may be moved over the partial enclosure 434 or to other positions, for example, to other enclosures or to interface with other processing systems not shown.

The lift mechanism 486 is coupled to the carrier assembly 430. The lift mechanism 486 generally controls the elevation of the carrier assembly 430 in relation to the partial enclosure 434. The lift mechanism 486 includes a linear actuator 488, such as a ball screw, lead screw, pneumatic cylinder and the like, and a guide 490 that slides along a rail 492. The rail 492 is coupled to the base support 484 by a hinge 494 so that the rail 492 of the lift mechanism 486 (i.e., direction of motion) may be controllably oriented through a range of angles between about 90 to about 60 degrees relative to horizontal. The lift mechanism 486 and hinge 494 allow the carrier assembly 430 holding a substrate 422 to be lowered into the partial enclosure 434 in various orientations. For example, to minimize the formation of bubbles on the substrate 422 when interfacing with fluids disposed within the enclosure 434, the substrate 422 may be oriented at an angle during entry into the partial enclosure 434 and then rotated to a horizontal orientation once therein.

The partial enclosure 434 generally defines a container or electrolyte cell in which an electrolyte or other polishing/deposition fluid can be confined. The enclosure 434 typically includes an anode/cathode 426, a diffuser plate 444 and a permeable disk 428 disposed therein. A permeable disk 428, such as a polishing pad, is disposed and supported in the electrolyte cell on the diffuser plate 444. The partial enclosure 434 can be a bowl shaped member made of a plastic such as fluoropolymers, TEFLON®, PFA, PE, PES, or other materials that are compatible with plating chemistries. The partial enclosure 434 is connected to a shaft 432 on its lower surface that extends below the base 482. The actuator is adapted to rotate the partial enclosure 434 about vertical axis x. In one embodiment, the shaft 432 defines a central passage through which fluid is delivered into the partial enclosure 434 through a plurality of ports 436 formed in the shaft 432.

Alternatively, the partial enclosure 434 can be connected to a mounting platform that is connected to the shaft 432. The shaft 432 is connected to an actuator (not shown), such as a motor, e.g., a stepper motor, disposed in the base 482.

The anode/cathode 426 is positioned at the lower portion of the enclosure 434 where it may be immersed in the electrolyte solution. The anode/cathode may perform as either an anode or a cathode depending on the positive bias (anode) or negative bias (cathode) applied to it. For example, depositing material from an electrolyte on the substrate surface, the anode/cathode 426 acts as an anode and the substrate surface acts as a cathode. When removing material from a substrate surface, such as by dissolution from an applied bias, the anode/cathode 426 functions as a cathode and the wafer surface or permeable disk 428 may act as an anode for the dissolution process.

The anode/cathode 426 can be a plate-like member, a plate having multiple holes formed therethrough or a plurality of pieces disposed in a permeable membrane or container. The anode/cathode 426 may be comprised of the material to be deposited or removed, such as copper, nickel, aluminum, gold, silver, tungsten and other materials which can be electrochemically deposited on a substrate. In at least one embodiment, the anode/cathode may comprise a non-consumable anode/cathode 426 of a material other than the deposited material, such as platinum for a copper deposition or electropolishing process. Alternatively, for deposition processes, the anode/cathode 426 comprises a consumable anode/cathode that may require periodic replacement.

In at least one embodiment, the anode/cathode 426 is ring-shaped defining a central opening through which the fluid inlet of the shaft 432 is disposed. In embodiments where the anode/cathode 426 is plate-like, a plurality of holes may be formed through the anode/cathode to allow passage of electrolyte fluid therethrough. The anode/cathode 426 can alternatively be a ring anode/cathode, a plate anode/cathode, or a chamber confining plating material, including a permeable chamber or other enclosure.

The permeable disk 428 can be a polishing article or other type of volume spacer that is compatible with the fluid environment and the processing specifications. The permeable disk 428 is positioned at an upper end of the partial enclosure 434 and supported on its lower surface by the diffuser plate 444. The permeable disk 428 is preferably permeable to ions in the electrolyte, and as such does not have to be permeable to metal ions, for example, copper ions in copper applications. The metal ions can be supplied from a fluid delivery line 40 having an outlet 42 positioned above the permeable disk 428. The permeable disk 428 may be disposed adjacent to or in contact with the anode/cathode 426.

The permeable disk 428 may comprise a plurality of pores of a sufficient size and organization to allow the flow of electrolyte to the substrate surface while preventing the flow of deposition by-products, such as accelerator and suppressor degradation by-products. The permeable disk 428 may also comprise grooves formed therein to assist transport of fresh electrolyte from the bulk solution into enclosure 434 to the gap between the substrate 422 and the permeable disk 428. However, the permeable disk 428 can be permeable to metal ions in some applications.

Typically, the permeable disk 428 includes polishing article, such as a polishing pad comprised of polymeric materials, such as polyurethane. Examples of polishing pads which can be used include, but are not limited to, an IC 1000, an IC 1010, a Suba series pad, a Politex series pad, a MHS series pad from Rodel, Inc., of Phoenix, Ariz., or a PVDF pad from Asahi of Japan, or a fixed abrasive pad from 3M, of Minneapolis, Minn.

The permeable disk may be polishing article including conductive material for electroplating deposition and electropolishing processes. For example, in an electropolishing process, the conductive polishing article may comprise a conductive polymer, or a polymer, such as polyurethane, with conductive elements or materials (not shown) embedded or formed therein, to provide a conductive path over the polishing article. The conductive elements are electrically connected to one another in the polishing article and may contact the substrate surface when the substrate is in contact with the polishing article. Further examples of conductive polishing materials and polishing articles are disclosed in U.S. Provisional Patent Application Serial No. 60/286,107, filed on Apr. 24, 2001, which is incorporated herein by reference to the extent not inconsistent with the claims and aspects described herein.

When a conductive polishing article is used for the permeable disk, the conductive polishing article may be in electrical contact with the power source (not shown), and may be used as an anode in an electrical based dissolution process. Alternatively, the polishing article may form an insulator material, or a material of low conductance, such as polyurethane for an electrodeposition process.

The power supply (not shown) is connected to the substrate surface through the apparatus 420. The power supply may include a control circuit that switches between a constant current operation and a constant voltage operation. A control circuit of the power supply controls the polarity of the output. In one embodiment, the power supply includes a switching circuit that is programmable to produce a variety of output waveforms, such as an output waveform comprising repetitions of a constant current output for a first duration and a constant voltage output for a second duration. The invention contemplates utilizing a variety of power supply designs that are capable of producing such output waveforms, such as time-varying potential between an anode and a cathode, or device performing as an anode or cathode, and is not limited to any particular power supply design. For example, the power supply may be adapted to apply a time varying anodic potential to a substrate surface.

The diffuser plate 444 provides support for the permeable disk 428 in the partial enclosure 434. The diffuser plate 444 can be secured in the partial enclosure 434 using fasteners such as screws 438 or other means such as snap or interference fit with the enclosure, being suspended therein and the like. The diffuser plate 444 can be made of a material such as a plastic, e.g., fluoropolymer, PE, TEFLON®, PFA, PES, HDPE, UHMW or the like. The diffuser plate 444, in at least one embodiment, includes a plurality of holes or channels 46 formed therein. The holes 446 are sized to enable fluid flow therethrough and to provide uniform distribution of electrolyte through the permeable disk 428 to the substrate 422. The permeable disk 428 can be fastened to the diffuser plate 444 using adhesives that are compatible with the fluid environment and the processing requirements. The diffuser plate 444 is preferably spaced from the anode/cathode 426 to provide a wider process window, thus reducing the sensitivity of plating film thickness to the anode/cathode dimensions, and to separate the accelerator and suppressor decomposition by-products, for example, a mono-sulfide compound degraded from an accelerator, such as bis(3-sulfopropyl)disulfide, $C_6H_{12}Na_2O_6S_4$, commercially available from the Raschig Corp. of Germany, from a main plating volume 438 defined between the permeable disk 428 and the substrate 422.

While not shown, a membrane may be disposed between the anode/cathode 426 and the permeable disk 428 to contain particles produced from the anode/cathode film from entering the enclosure 434 and depositing as particles on the substrate surface. For example, the membrane is permeable to electrolyte flow, but is not typically permeable to accelerator and suppressor degradation by-products on the anode/cathode surface.

The substrate carrier or head assembly 430 is movably positioned above the permeable disk 428. The substrate carrier assembly 430 is vertically movable above the permeable disk 428 and is laterally movable thereto, for example, the carrier assembly 430 may be rotatable about a vertical axis y. The x and y axis of the partial enclosure and the head assembly, respectively, are offset to provide orbital motion between the permeable disk 428 and the substrate carrier assembly 430. Orbital motion is broadly described herein as an elliptical relative motion between the permeable disk 428 and the substrate carrier assembly 430. The substrate carrier assembly 430 holds a substrate 422 with the deposition surface facing down towards the permeable disk 428. Alternatively, the permeable disk 428 may comprise a surface which may move in a translational or linear relative motion as well as rotatable, or circular rotational, relative motion to the substrate carrier assembly 430.

The substrate carrier assembly 430 generally includes a drive system 468, a head assembly 478 and a seat assembly 476. The drive system 468 is generally coupled to the guide 490 of the stanchion 480. The drive system 468 comprises a column 470 that extends from a power head 456 to support the seat assembly 476. The power head 456, which may be an electric or pneumatic motor, generally provides rotation to the column 470 along a central axis. The drive system 486 additionally includes an actuator 454 that is disposed within the column 470 and is coupled to the head assembly 478. The actuator 454, which may be a lead screw, pneumatic cylinder or other linear actuator, allows the head assembly 478 to move in relation to the seat assembly 476.

The seat assembly 476 generally includes a plurality of gripper fingers 474 disposed in a polar array about a gripper plate 472. The gripper plate 472 is coupled to the column 470 so that the gripper plate 472 moves with the drive system 468. In one embodiment, three gripper fingers 474 are provided. The gripper fingers 474 generally include a base member 466, an extension 464 and a contact finger 462. The contact fingers 462 are disposed at an angle to the extension 464. The extension 464 is coupled to the base member 466. The base member 466 is rotatably coupled to the gripper plate 472. The base member 466 generally includes an aperture that aligns with a hole in the gripper plate 472. A clevis pin or other shaft member is disposed through the hole and aperture to allow rotation of the gripper finger 474 in relation to the gripper plate 472.

An actuator 460 is coupled between the extension 464 and the gripper plate 472. The actuator 460 moves the gripper finger 474 between an open and closed position. A spring 458 may be optionally disposed on the clevis pin to bias the gripper finger 474 towards one position. When the contact fingers 462 are moved inward, a notch 452 disposed at the ends of each contact finger 462 defines a seat 450 that is adapted to receive the substrate 422 from a transfer robot (not shown). In the inward position, the extensions 464 are disposed at a distance from each other that allows the substrate 422 and robot to pass therebetween (See FIG. 7A).

Further, while not shown, a computer based controller may be connected to the apparatus 420 for instructing the system to perform one or more processing steps on the system, such as polishing a substrate or transferring a substrate in the apparatus 420.

Figure 5:
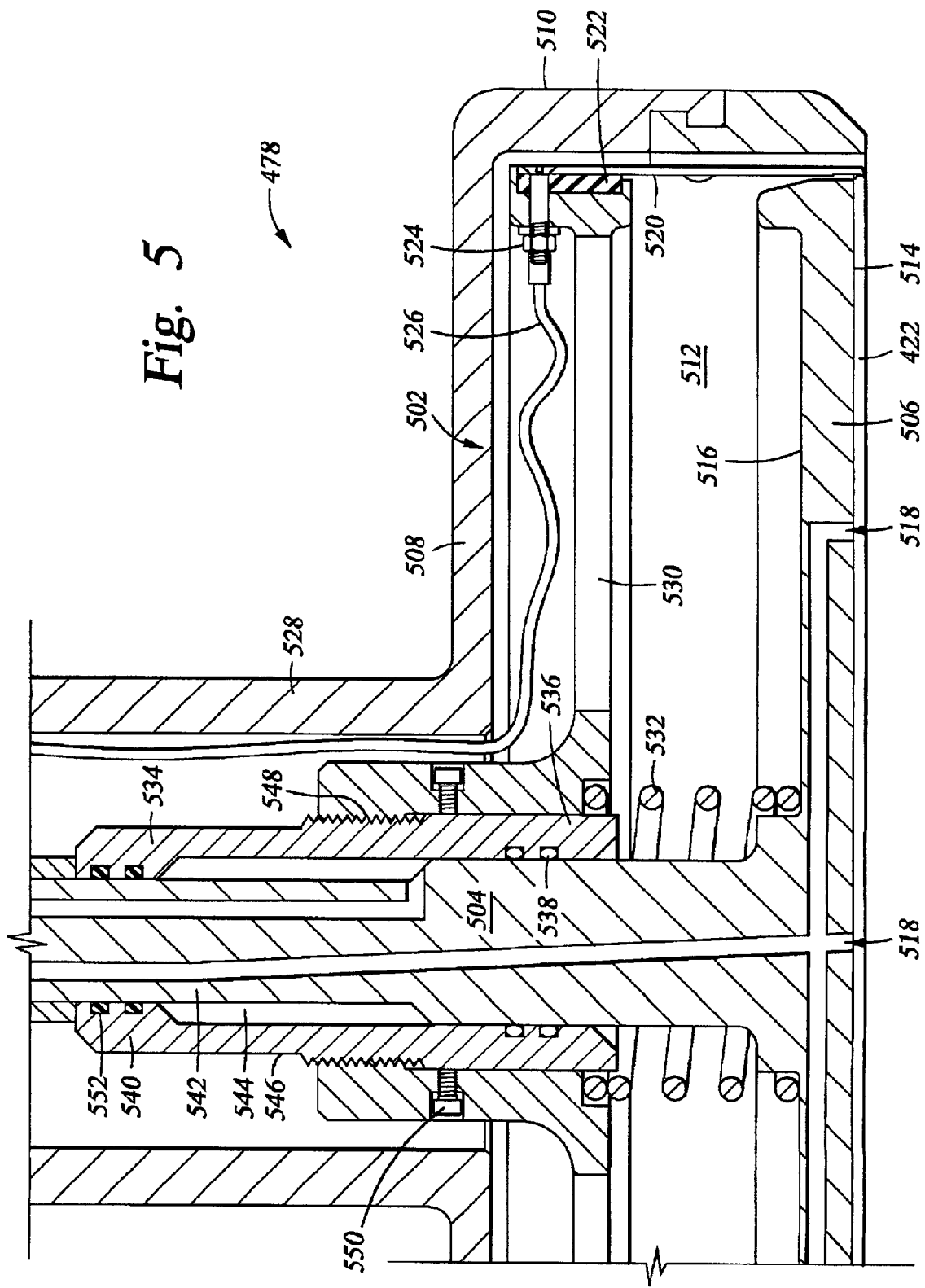
FIG. 5 is a partial cross sectional view of one embodiment of a carrier head assembly.

FIG. 5 depicts one embodiment of the head assembly 478. The head assembly 478 generally includes a housing 502, a stem 504, a support plate 506 and a plurality of substrate clamps 520 (one of the clamps 520 is shown). Generally, the housing 502 includes a hollow shaft 528 coupled to the actuator 454 at one end and terminating in a flange 508 at the opposite end. The flange 508 has a downwardly extending lip 510 that defines a central cavity 512.

The support plate 506 is disposed in the central cavity 512. The support plate 506 has a first side 514 and a second side 516. The substrate 422 is generally disposed proximate the first side 514 during processing. The first side 514 may additionally include one or more vacuum ports 518 disposed therein to restrain the substrate 422 proximate the first side 514.

The stem 504 is coupled to a second side 516 of the support plate 506. The stem 504 is generally orientated perpendicular to the support plate 506. The stem 504 may include passages disposed therein to provide vacuum or fluid to the first side 514 of the support plate 508 or other portions of the head assembly 478.

The substrate clamps 520 are generally comprised of a conductive material, such as copper. The substrate clamps 520 are coupled to a conductive ring 522 that electrically couples the individual substrate clamps 520. A screw typically fastens the substrate clamps 520 to the conductive ring 522 although other fasteners or fastening methods may be utilized. The conductive ring 522 generally includes a terminal 524 to allow the ring 522 to be electrically biased by a power source (not shown) coupled to the ring 522 by a lead 526 routed through the housing 502.

Figure 6A:
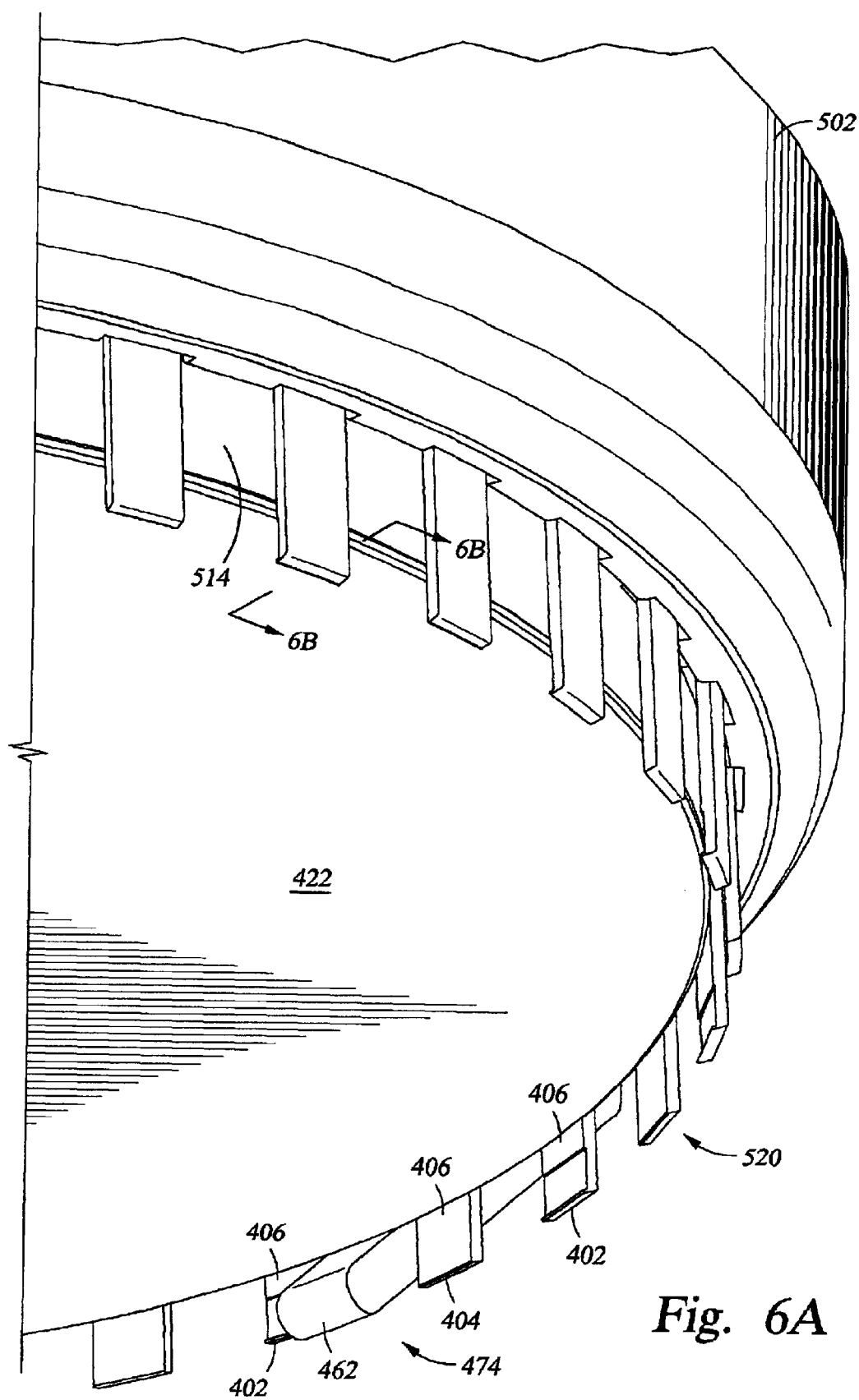
FIG. 6A is a partial perspective view of a plurality of substrate clamps.

FIG. 6A depicts a partial perspective view of the substrate clamps 520 extending from the first side 514 of the support plate 506. The substrate clamps 520 are generally disposed in a polar array at the perimeter of the support plate 506. In one embodiment, clamps 520 are movable relative to the support plate 506 such that a distance which the clamps 520 project from the support plate 506 may be controlled. Generally, the substrate clamps 520 comprise a plurality of first clamps 402 and a plurality of second clamps 404 spaced equally about the perimeter of the support plate 506. The first and second clamps 402, 404 generally alternate in sequence around the perimeter and are spaced to allow the gripper fingers 474 to pass therebetween. The first clamps 402 are generally rectangular in shape and may be optionally curved across their width to match the diameter of the substrate 422. The second clamps 404 are also generally rectangular in shape and may be optionally curved to match the diameter of the substrate 422. Both the first clamps and second clamps 402, 404 have an inner surface 406 that contacts the substrate.

Figure 6B:
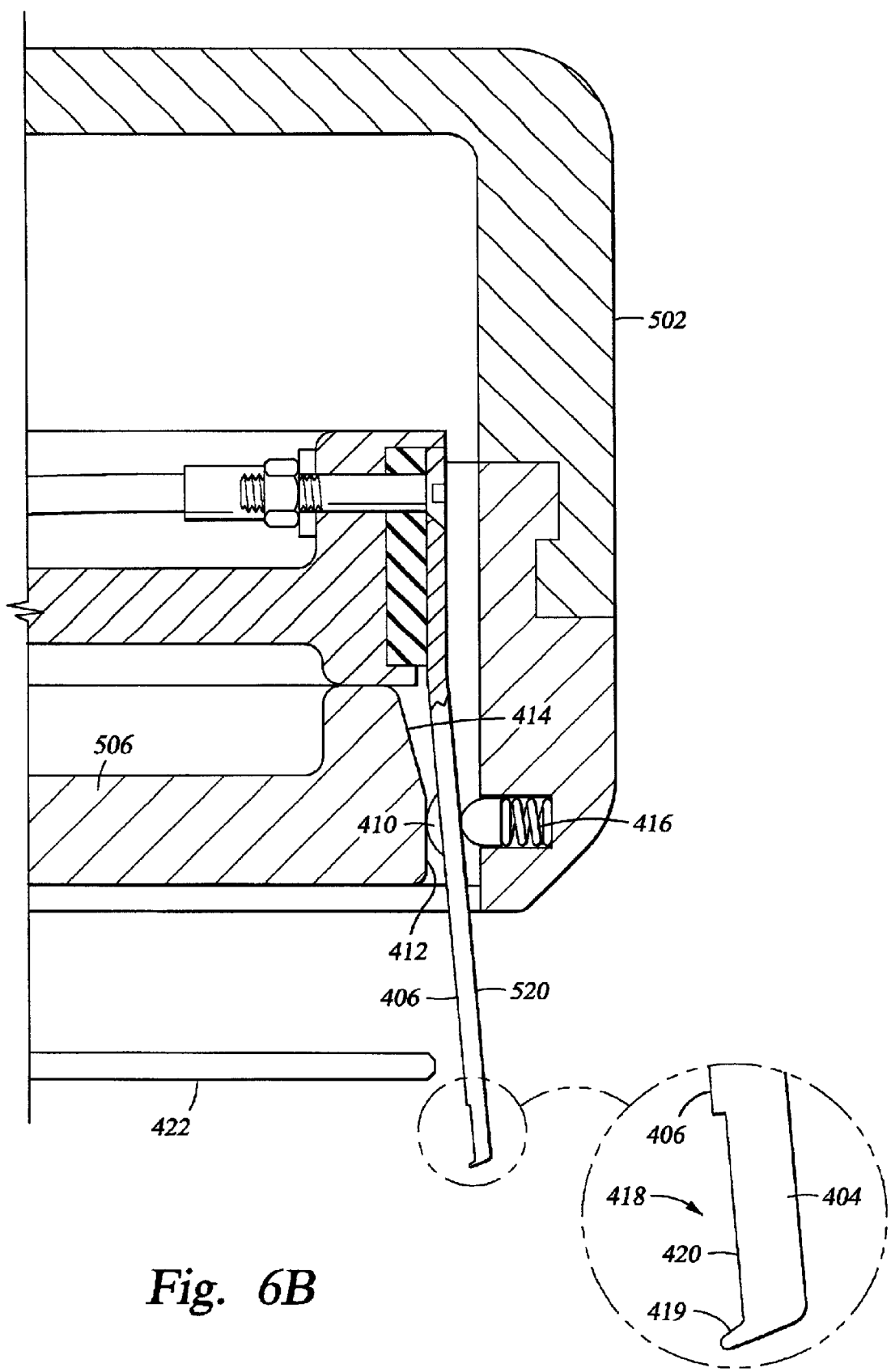
FIG. 6B is a sectional view of one of the substrate clamps taken along section line 6B—6B of FIG. 6A.

As illustrated in FIGS. 6A and 6B, the clamps 520 are angled outward to allow the substrate 422 to pass therebetween when extended. A bump 610 disposed on the inner surface of the clamp 520 interfaces with a peripheral surface 412 of the support plate 506. The bump 410 causes the clamp 520 to flare outwardly when the clamp 520 is extended. Optionally, support surface 506 may include a chamfer 414 to allow smooth movement of the bump 410 onto the surface 412 of the support plate 506. The housing 502 generally includes a biasing member disposed radially outward of the clamps 520 that urges the clamps 520 inward. In one embodiment, the biasing member is a détente pin 416.

The second clamp 404 generally includes a notch 418 formed on the contact surface near the tip. The notch 418 has a bottom surface 620 that is generally greater in length than the thickness of the substrate 422. A wall 419 of the notch 418 closest the end of the first clamp 604 is generally chamfered or angled to contact the bevel or rounded edge of the substrate 422.

Figure 7A:
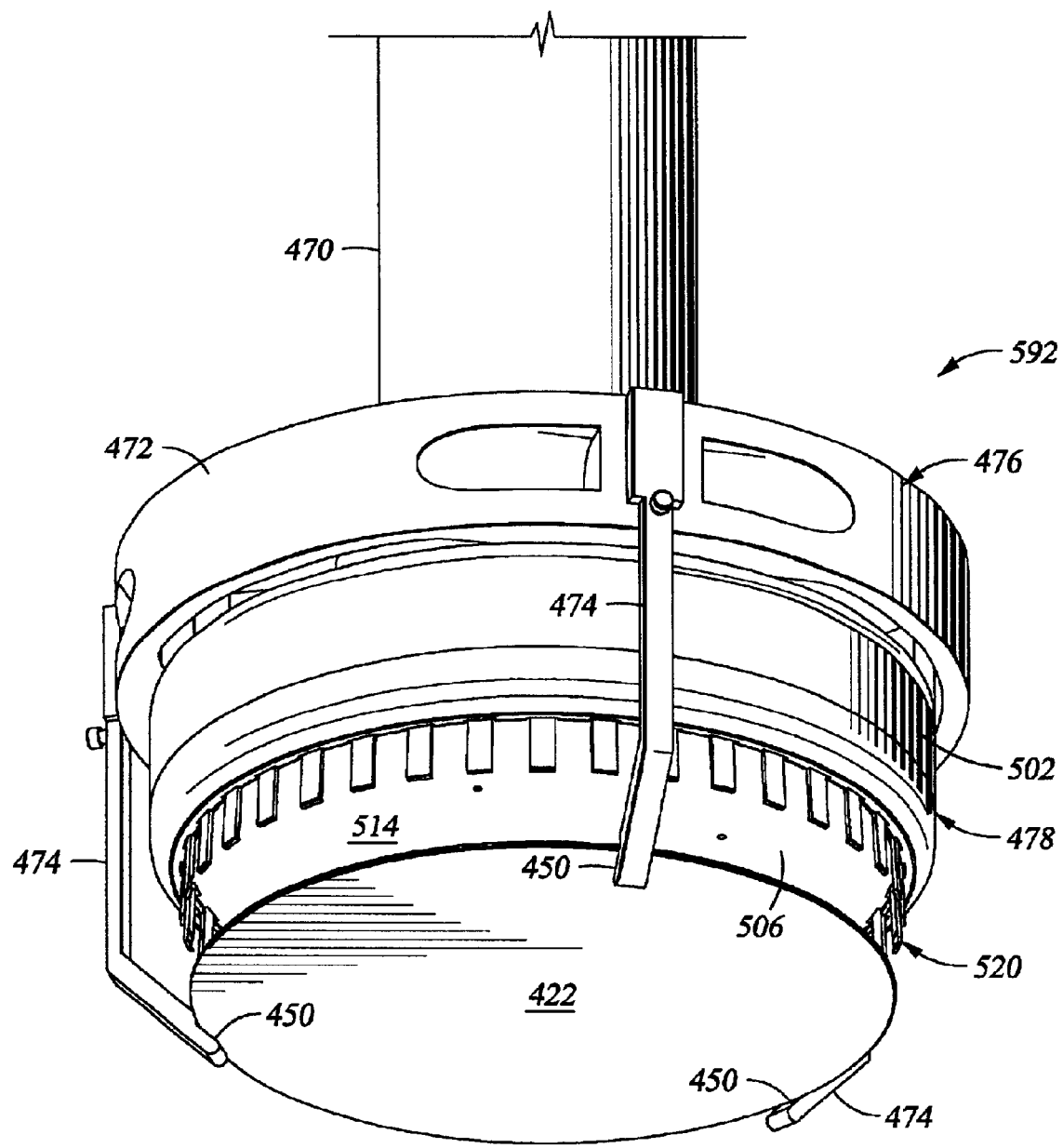
FIGS. 7A through 7D depict a substrate being secured to the carrier head assembly.
Figure 7B:
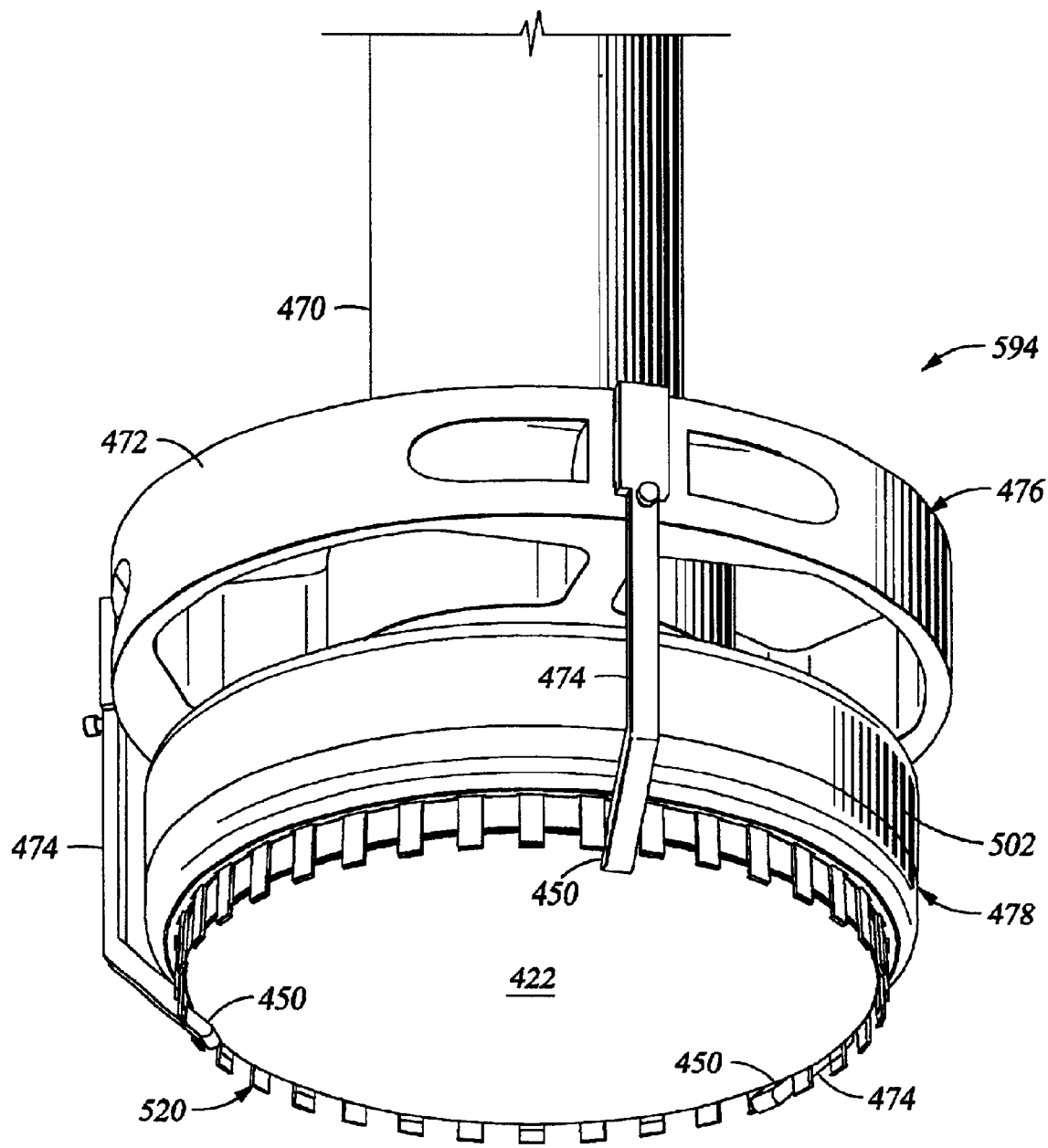
Figure 7D:
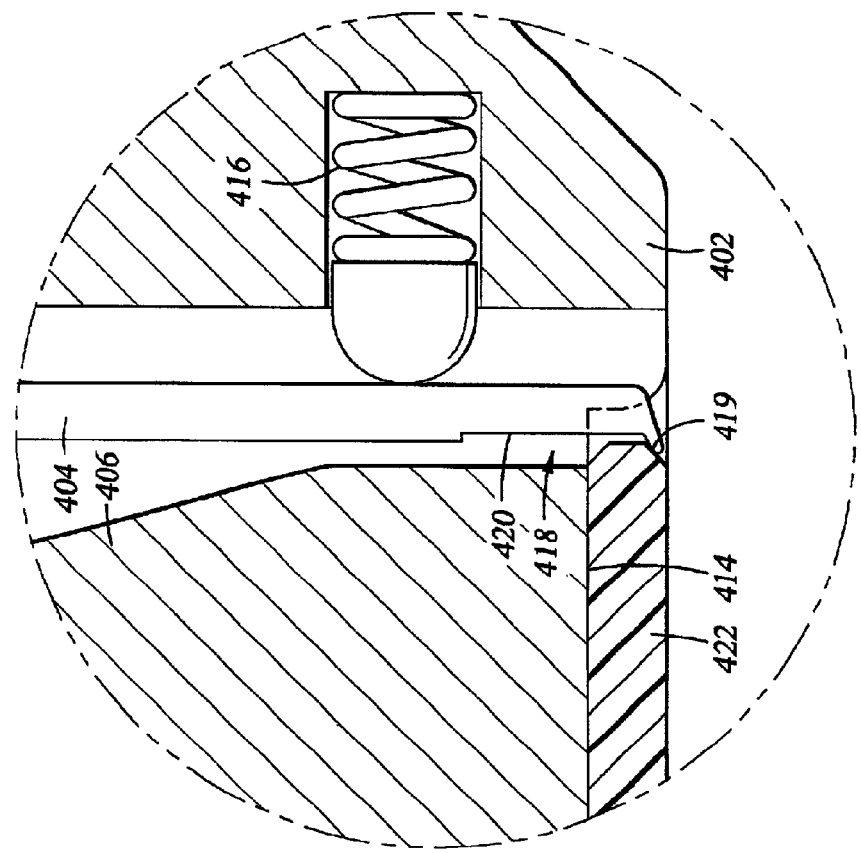
Figure 7C:
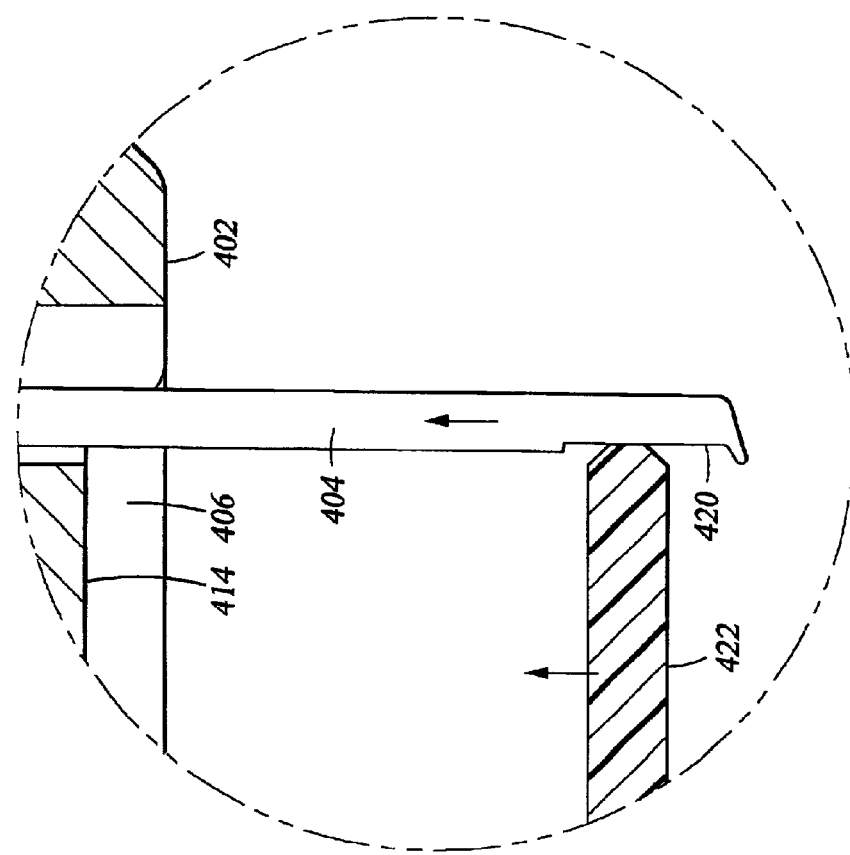

FIGS. 7A–7D depict the substrate 422 being loaded into the carrier assembly 430. In FIG. 7A, the gripper fingers 474 are rotated to form the seat 450 that receives the substrate 422 from the robot not shown. The head assembly 478 is disposed in a first position 592 proximate the seat assembly 476. The substrate clamps 522 are fully extended from the first side 514 of the support plate 508. After the robot is removed leaving the substrate 422 in the seat 450 of the gripper finger 474, the head assembly 478 is then extended into a second position 504 to load the substrate 422 held in the seat 450 between the substrate clamps 522 (See FIG. 7B). The first clamps 402 center the substrate 422 relative to the head assembly 478.

The clamps 522 are then retracted towards the support plate 508. The angled wall 419 of the second clamp 404 contacts the beveled edge of the substrate 422 and pulls the substrate 422 against the support plate 508. The interaction between the angled wall 419 and substrate 422 additionally causes the second clamp 404 to flex outwardly against the detente pin 416, displacing the bottom surface 420 of the notch 418 from the substrate perimeter. The flexed second clamp 404 and the detente pin 416 combine to urge the second clamp 404 inwardly to capture the substrate 422 against the support plate 508 while providing good electrical contact between the clamp 404 and substrate 422 (See FIGS. 7C and 7D).

Returning to FIG. 5, the conductive ring 522 is secured to a mounting plate 530 that is disposed in the central cavity 512 between the housing 502 and the support plate 506. The mounting plate 530 is generally movable relative to the support plate 506 so that the distance the substrate clamps 520 extend beyond the first side 514 of the support plate may be controlled. Generally, the mounting plate 530 is biased away from the support plate 506 by a spring 532 disposed therebetween.

To facilitate movement of the mounting plate 530 and substrate clamps 520, the mounting plate 530 is coupled to a sleeve 534 that is movably disposed around the stem 504. The sleeve 534 has a first diameter portion 536 that is sealed against the stem 504 at one end by a seal such as an o-ring 538. The sleeve 534 has a smaller, second diameter portion 540 that interfaces with a narrower portion 542 of the stem 504. The narrower portion 542 of the stem 504 is sealed to the sleeve 534 by an o-ring 552, thus creating a piston chamber 544 between the stem 504 and sleeve 534. As fluid, such as air, is applied or evacuated from the chamber 544, the resulting force applied between the sleeve 534 and stem 504 causes the sleeve 534 to move, thus correspondingly moving the substrate clamps 520.

An outer portion 546 of the sleeve 534 is threaded and mates with a corresponding male threaded portion 548 disposed in the mounting plate 530. The amount of thread engagement between the mounting plate 530 and sleeve 534 may be adjusted to set the distance the substrate clamps 520 protrude from the support plate 506 at a predetermined amount. A set screw 550 in the mounting plate 530 may be tightened to prevent the mounting plate 530 from inadvertently turning about the sleeve 534.

FIG. 8 depicts a partial view of another embodiment of a substrate carrier head assembly 800. The substrate carrier head assembly 800 is substantially similar to the substrate carrier assembly 430 described above except when a contact plate 802 is disposed on a support plate 804. Generally, the contact plate 802 is disposed on a first side 806 of the support plate 804. The contact plate 802 is comprised of a conductive material and is utilized to bias the substrate 422 during processing. The contact plate 802 is electrically coupled to a terminal 810 disposed on a second side 812 of the support plate 804. The terminal 810 facilitates coupling the contact plate 802 to a power source (not shown) by a lead 808 that is used to bias the substrate 422.

The contact plate 802 is generally located proximate the edge of the substrate 422. The contact plate 802 couples the bias, such as voltage bias, to the substrate 422 directly or to a conductive seed layer 820 disposed on the substrate surface that wraps around the substrate edge to a portion of the substrate backside.

Figure 9:
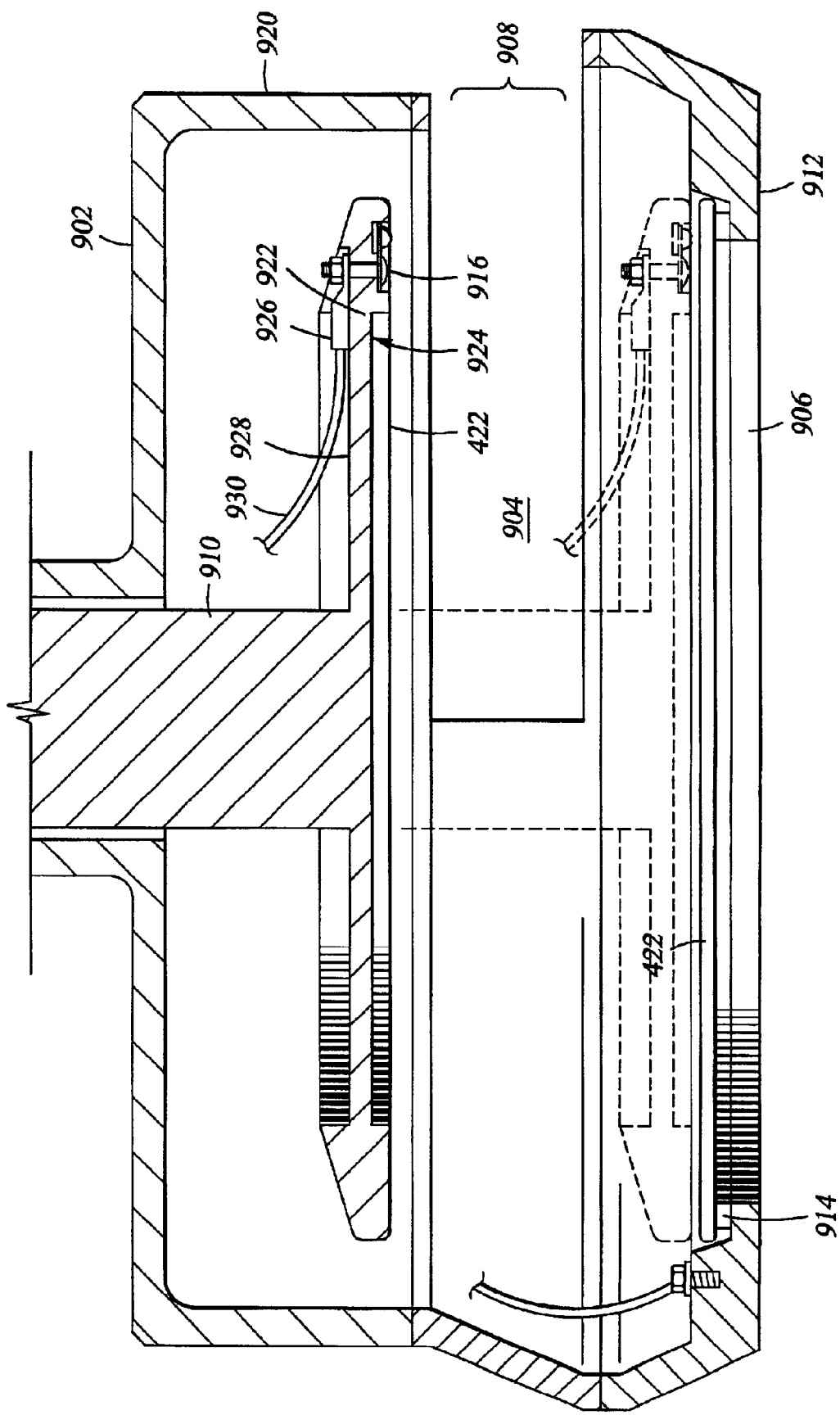
FIG. 9 depicts a partial view of another embodiment of a carrier head assembly.

FIG. 9 depicts another embodiment of a substrate carrier head assembly 900. The substrate carrier head assembly 900 generally includes a housing 902 defining a central cavity 904 with an opening 906 disposed on a bottom portion of the housing 902 and at least one port 908 disposed in a vertical section 920 of the housing 902. The port 908 is sized to allow for a substrate 422 to be received horizontally within the cavity 904 from a robot (not shown).

An actuating shaft 910 is disposed in the housing 902 and may actuate a support plate 922 towards the opening 906 of the housing 902 by a motor (not shown) disposed in or connected to the substrate carrier. The support plate 922 receives a substrate from the robot and secures the substrate face-down in a horizontally displaced manner.

The support plate 922 includes a contact plate 916 disposed on a first side 924 of the support plate 922. The contact plate 916 is comprised of a conductive material and is utilized to bias the substrate 422 during processing. The contact plate 916 is electrically coupled to a terminal 926 disposed on a second side 928 of the support plate 922. The terminal 926 facilitates coupling the contact plate 916 to a power source (not shown) by a lead 930 that is used to bias the substrate 422. The contact plate 916 is generally located proximate the edge of the substrate 422. The contact plate 916 couples the bias, such as voltage bias, to the substrate 422 directly or to a conductive layer disposed on the substrate surface that wraps around the substrate edge to a portion of the substrate backside.

A contact ring 912 circumscribing the opening 906 includes a substrate support 914 that supports the substrate 422 as the actuating shaft 910 urges the substrate 422 against the contact ring 912. The substrate support 914 may comprise an annular ring for continuous contact with the substrate surface or may comprise a series of contact points circumferentially disposed around the contact ring 912 and extending to contact the substrate 422 disposed thereon. The contact ring 912 reduces contact between the substrate surface and planar polishing article disposed in a processing cell. As such, the substrate carrier assembly may be used for electrochemical deposition and electrochemical dissolution processes in the absence of polishing article or where limiting polishing of the substrate is desired by the user. While not shown, the substrate support 914 may be coupled to a power source (not shown) by a lead 930 that is used to bias the substrate 422 and the contact ring 912 comprises an insulative material.

Figure 10A:
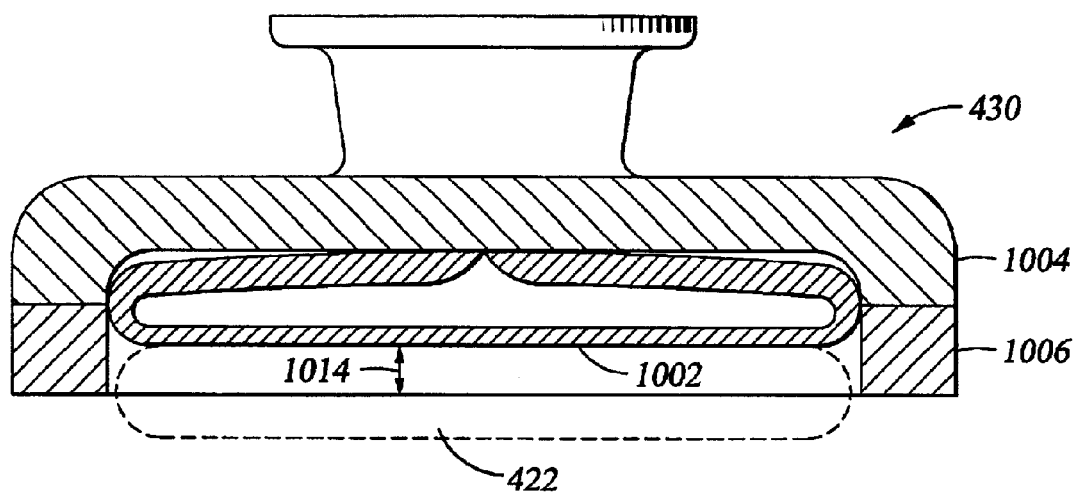
FIGS. 10A–10B depict partial views of embodiments of a carrier head assembly.

FIG. 10A depicts a schematic cross-sectional view of another embodiment of the polishing head 430. The polishing head 430 may be used in embodiments of the invention wherein a conductive permeable disk, such as a conductive polishing article, is being used for the anodic dissolution process. The polishing head 430 generally includes a carrier plate 1002, a cover 1004 and a retaining ring 1006. The carrier plate 1002, which in one embodiment may comprise an inflatable bladder, generally presses the substrate 1014 against polishing article, for example, that may be disposed in stations 106, 102 of FIG. 1. The retaining ring 1006 generally circumscribes the carrier plate 1002 and prevents the substrate 1014 from moving laterally out from under the polishing head 1030 during processing.

The carrier plate 1002 and retaining ring 1006 are generally movable relative to one another in an axial direction. A relative distance 1014 between the carrier plate's bottom and the retaining ring 1006 may be controlled thus setting the relative distance that the substrate 1014 extends beyond the retaining ring 1006, or the amount of pressure the retaining ring 1006 exerts on the permeable disk or polishing article.

Figure 10B:
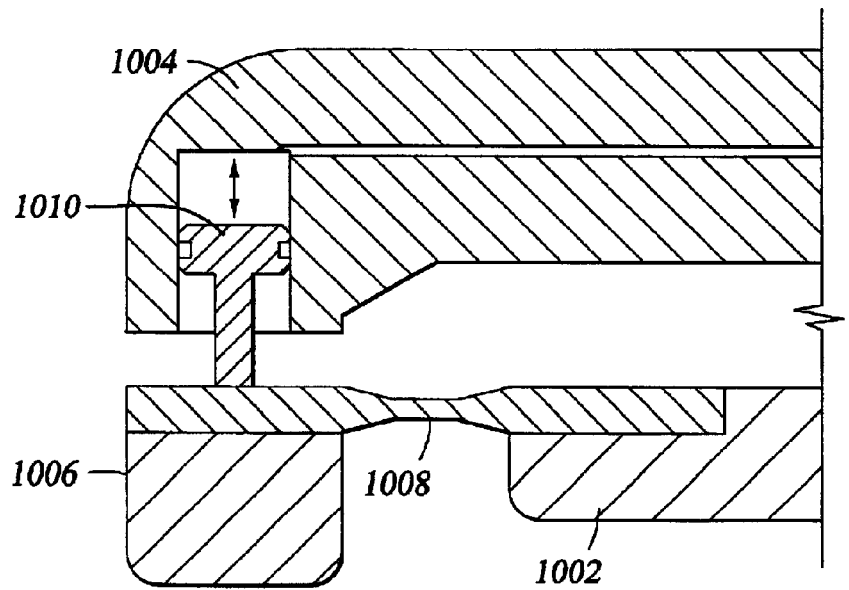

In an alternative embodiment of the polishing head depicted as a partial schematic view in FIG. 10B, the retaining ring 1006 is movably coupled to the polishing head 430 by a flexure. The flexure 1008, which may be a flexible metal sheet or polymer, is disposed between the retaining ring 1006 and the carrier plate 1002 to allow axial movement therebetween. A piston 1010 disposed in the cover 1004 is coupled to the retaining ring 1006. Fluid is supplied to (or removed from) the piston 1010 and urges the retaining ring 1006 in the axial direction, thereby defining the distance 1014.

Another apparatus which may be used to practice the processes described herein and may be used or adapted for use in processing system 200 as shown in FIGS. 2 and 3 is more fully described in U.S. patent application Ser. No. 09/770,559, filed Jan. 26, 2001, which has issued as U.S. Pat. No. 6,613,200, issued Sep. 2, 2003, which is incorporated herein by reference.

FIGS. 11A–11D are schematic cross sectional views of embodiments of an apparatus 1120 for depositing and planarizing a metal layer on a substrate 1122.

Figure 11A:
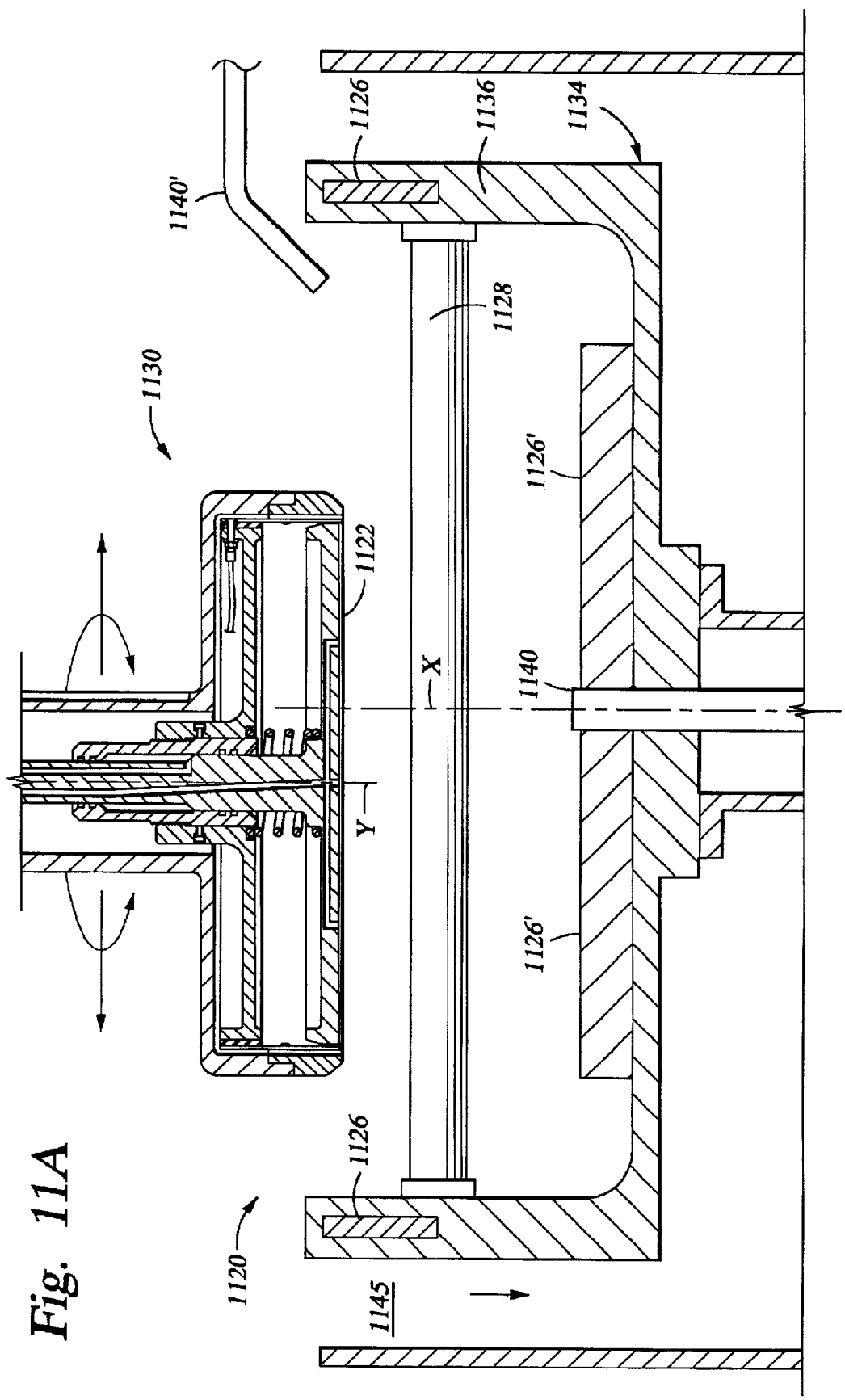
FIGS. 11A–11D are schematic cross sectional views of embodiments of an apparatus for depositing and planarizing a metal layer on a substrate.

FIG. 11A shows an apparatus 1120 adapted to polish the surface of the substrate 1122 using a roller 1128 of a polishing material. The polishing material may be made of a conductive material, an insulative material, conductive elements disposed in an insulative material, and/or include abrasive elements or particles as described herein.

The apparatus 1120 includes a carrier head assembly 1130 positionable over a partial enclosure 1134. The partial enclosure 1134 generally defines a container or electrolyte cell in which an electrolyte or other polishing/deposition fluid can be confined. The enclosure 1134 typically includes an anode/cathode 1126 and a roller 1128 of polishing material disposed therein. The partial enclosure 1134 can be connected to a mounting platform that is connected to an actuator (not shown), such as a motor, e.g., a stepper motor. The actuator is adapted to rotate the partial enclosure 1134 about vertical axis x. In one embodiment, a shaft 1140 defines a central passage through which fluid is delivered into the partial enclosure 1134. Alternatively, fluid is delivered into the partial enclosure 1134 via an inlet 1140' disposed adjacent the enclosure 1134.

The anode/cathode 1126 may comprise an anode/cathode ring disposed in the walls 1136 of the enclosure 1134 and adapted to have a bias with the substrate 1122 and/or roller 1128 for performing deposition and anodic dissolution. Alternatively, the anode/cathode 1126' can be positioned at the lower portion of the enclosure 1134 where it may be immersed in the electrolyte solution. The anode/cathode 1126 may perform as either an anode or a cathode depending on the positive bias (anode) or negative bias (cathode) applied to it. For example, when removing material from a substrate surface, such as by anodic dissolution from an applied bias, the anode/cathode 1126 functions as a cathode and the wafer surface or permeable disk 1128 may act as an anode for the dissolution process. A weir 1145 may be disposed on the outer surface of the enclosure 1134 to capture electrolyte, which may then be filtered and recycled through shaft 1140 or be disposed.

The substrate carrier or head assembly 1130 is movably positioned above the roller 1128. The substrate carrier assembly 1130 is vertically movable above the roller 1128 and is laterally movable thereto, for example, the carrier assembly 430 may be rotatable about a vertical axis y. The x and y axis of the partial enclosure and the head assembly, respectively, are offset to provide orbital motion between the roller 1128 and the substrate carrier assembly 1130.

The substrate carrier assembly 1130 generally holds a substrate 1122 with the deposition surface facing down towards the roller 1128. The substrate carrier assembly 1130 may be adapted to provide the substrate in a vertical position to the enclosure 1134. The roller 1128 comprises a cylindrical surface of polishing material that may be rotated parallel to the substrate surface to polish the substrate surface. The roller 1128 may "sweep" or be moved in a relative parallel motion, ie., translational or linear relative motion, across the surface of the substrate to polish the substrate. The roller 1128 may further be rotated horizontally across the surface of the substrate or to expose additional material for contact with the substrate surface.

In one aspect of the roller 1128, the roller is adapted to have a lengthwise width of about the substrate diameter plus an additional width between about one-quarter (¼") of an inch and about one (1") inch on either side of the substrate diameter. The roller diameter may be of any amount dependent on the requirements of the user and the size of the system. For example, a roller having a diameter between about three (3) and about four (4) inches may be used in the electrochemical processing cells described herein.

Figure 11B:
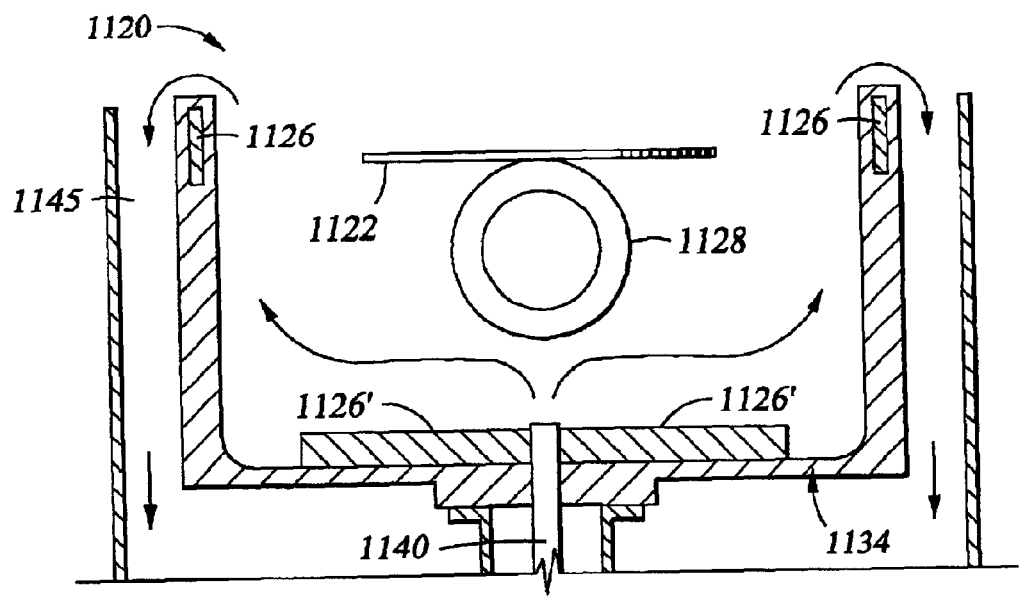

The roller may be rotated axially or vertically at a rate of about 500 rpms or less, such as between about 10 rpms and about 200 rpms, during polishing. The roller may be moved across the surface of the substrate at a rate sufficient to ensure effective polish of the substrate surface, for example, at about one-half (½") inch per second. FIG. 11B is a schematic side view of FIG. 11A showing apparatus 1120 with the substrate 1122 and roller 1128 of polishing material contacting each other during polishing. The substrate is horizontally positioned, with the surface to polished facing down, and lowered into the enclosure 1134 and positioned in contact with the roller 1128 of polishing material for the polishing process.

Figure 11C:
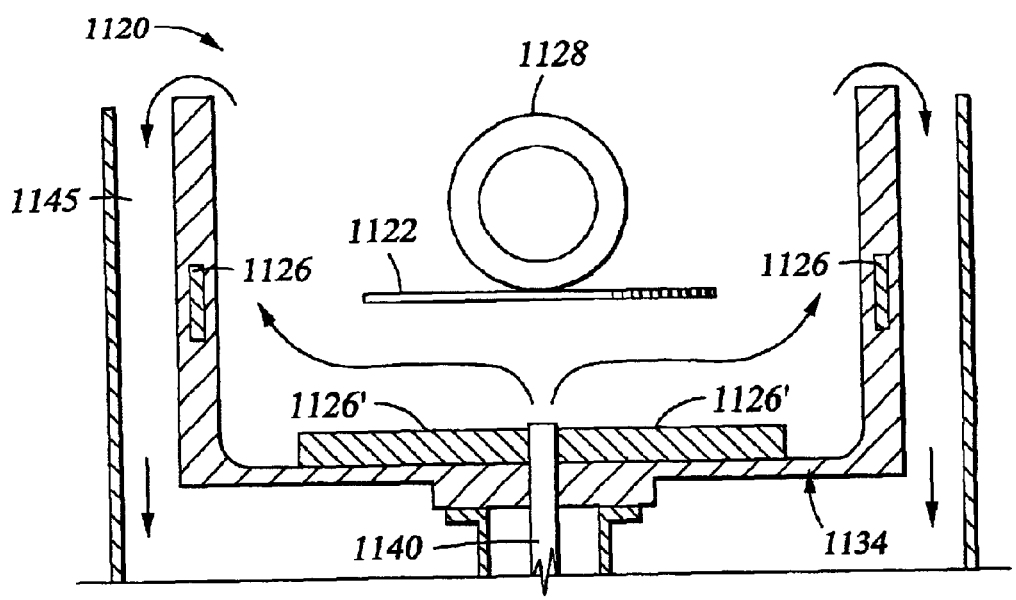

FIG. 11C is a schematic side view of another embodiment of the apparatus 1120. In the embodiment shown in FIG. 11C, the substrate 1122 is disposed face up in the electrolyte solution within the enclosure 1134. The roller 1128 of polishing material is then positioned over and across the substrate surface to provide mechanical activity across the substrate surface to remove material from the substrate surface.

Figure 11D:
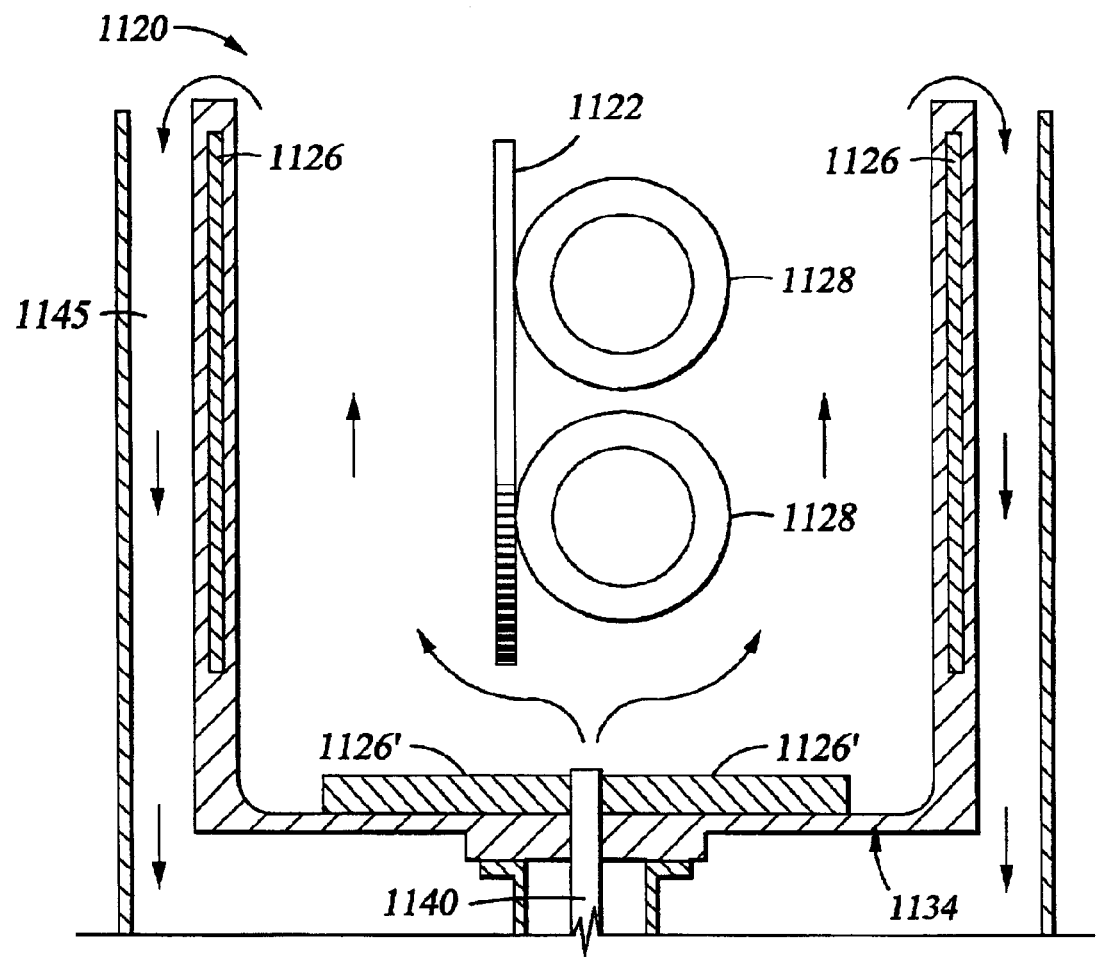

FIG. 11D is a schematic side view of another embodiment of the apparatus 1120. In the embodiment shown in FIG. 11D, the substrate 1122 is vertically disposed face down in the electrolyte solution within the enclosure 1134. One or more rollers 1128 of polishing material, which may be conductive, are positioned in series to provide mechanical activity across the substrate surface to remove material from the substrate surface.

To facilitate control of embodiments of the systems and apparatus described above, computer based controllers may include a CPU (not shown), which CPU may be one of any form of computer processors that can be used in an industrial setting for controlling various chambers and subprocessors. Memory (not shown) is coupled to the CPU. The memory, or computer-readable medium, may be one or more of readily available memory such as random access memory (RAM), read only memory (ROM), floppy disk, hard disk, or any other form of digital storage, local or remote. For storing information and instructions to be executed by the CPU.

The support circuits are coupled to the CPU for supporting the processor in a conventional manner. These circuits include cache, power supplies, clock circuits, input/output circuitry and subsystems, and may include input devices used with the controller, such as keyboards, trackballs, a mouse, and display devices, such as computer monitors, printers, and plotters. Such controllers are commonly known as personal computers; however, the present invention is not limited to personal computers and can be implemented on workstations, minicomputers, mainframes, and supercomputers.

A process, for example the deposition and polishing process described below, is generally stored in the memory, typically as a software routine. The software routine may also be stored and/or executed by a second CPU (not shown) that is remotely located from the hardware being controlled by the CPU.

Although the process of the present invention is discussed as being implemented as a software routine, some or all of the method steps that are disclosed therein may be performed in hardware as well as by the software controller. As such, the invention may be implemented in software as executed on a computer system, in hardware as an application specific integrated circuit or other type of hardware implementation, or a combination of software and hardware.

Planarization Processes

Embodiments of the methods described herein provide for planarizing a substrate surface using electrochemical removal techniques and polishing techniques. In one aspect, a method is provided for processing a substrate including positioning the substrate in an electrolyte solution comprising a corrosion inhibitor, a leveling agent, a viscous forming agent, or combinations thereof, applying an anodic bias to a substrate, polishing the substrate in the electrolyte solution, and removing material from the surface of the substrate. While the process may be referred to herein as including steps, the steps do not need to be separate from one another and do not need to be separated in time.

Figure 12:
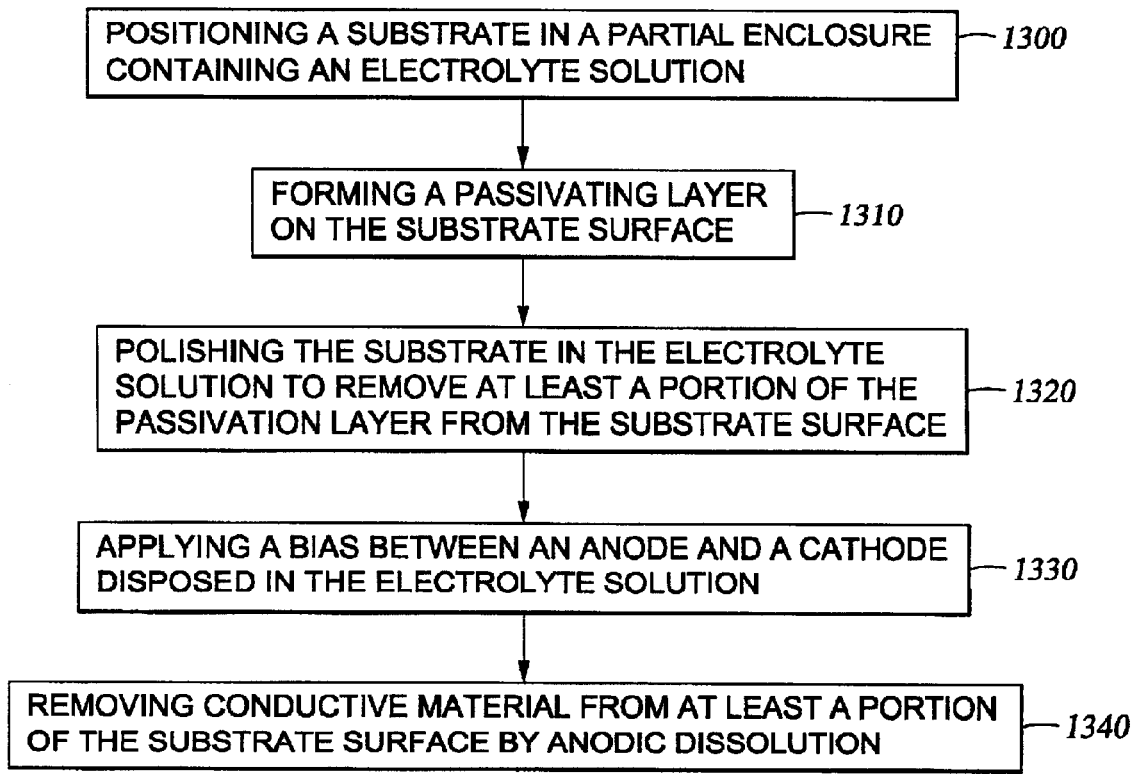
FIG. 12 is a flow chart illustrating the processing steps according to one embodiment of the invention.

FIG. 12 is a flow chart illustrating the processing steps according to one embodiment of the invention. The process begins by positioning a substrate in a substrate carrier assembly 430, and then positioning the substrate in the partial enclosure 434 containing an electrode and electrolyte solution at step 1300. The substrate may be electrically connected to a power source (not shown) and perform as an anode or cathode during substrate processing with the electrode performing as the cathode or anode respectively. Alternatively, the permeable disk 428 may be a conductive polishing material that electrically conducts power to the substrate during processing, such as during polishing techniques.

The substrate is disposed in an electrolyte solution in the enclosure to have at least the surface of the substrate contacting the electrolyte solution, and in one aspect, the entire substrate may be submerged in the electrolyte solution. The electrolyte solution may be provided to the partial enclosure 434 through the fluid delivery line 440 and/or through the fluid inlet below the permeable disk 428 as shown in FIG. 4.

The electrolyte solution disposed in the partial enclosure 434 may include commercially available electrolytes. For example, the electrolyte may include sulfuric acid based electrolytes or phosphoric acid based electrolytes, such as potassium phosphate ($K_3PO_4$), or combinations thereof, for copper electropolishing techniques and ECMP techniques. The electrolyte may also contain derivatives of sulfuric acid based electrolytes, such as copper sulfate, and derivatives of phosphoric acid based electrolytes, such as copper phosphate. Electrolytes having perchloric acid and/or acetic acid solutions and derivatives thereof may also be used. Additionally, the invention contemplates using electrolyte compositions conventionally used in electroplating processes including conventionally used electroplating additives, such as brighteners among others. In one aspect of the electrolyte solution, the electrolyte may have a concentration between about 0.2 Molar (M) and about 1.2 M of the solution. The electrolyte solution generally has a pH between about 3 and about 10.

In another aspect, the electrolyte solution may also comprise a base compound, such as potassium hydroxide (KOH) for example, to adjust the pH of the solution, which may be present in an amount up to about 70 percent by weight in volume of total solution and a phosphate system, such as ammonium dihydrogen phosphate ($NH_4H_2PO_4$), diammonium hydrogen phosphate ($(NH_4)_2HPO_4$), phosphoric acid, or a mixture thereof, in amounts between about 2 and about 30 percent by weight in volume of total solution. Dihydrogen phosphate and/or diammonium hydrogen phosphate may be present in amounts between about 15 and about 25 percent by weight in volume of total solution. Suitable electrolyte solutions are further disclosed in co-pending U.S. patent application Ser. No. 10/032,275 (Applied Materials, Inc., Docket No. AMAT 5998), entitled, "Electrolyte Composition And Treatment For Electrolytic Chemical Mechanical Polishing," filed on Dec. 21, 2001.

The electrolyte solution may also include a passivation or suppressing agent. Examples of passivation or suppressing agents include corrosion inhibitors, leveling agents, viscous forming agents, or combinations thereof. The passivation or suppressing agent disposed in the electrolyte allows for the formation of a passivation, or suppressing, layer on a substrate surface at step 1310. The passivation or suppressing layer is believed to insulate or limit the chemical and electrical reaction between the electrolyte and materials deposited on the substrate surface. The passivation or suppressing layer may be continuous or discontinuous.

Corrosion inhibitors prevent the oxidation or corrosion of metal surfaces by forming a layer of material to reduce or minimize chemical interaction between material disposed on the substrate surface and the surrounding electrolyte. The layer of material formed by the corrosion inhibitors insulate the surface from the surrounding electrolyte, thus, suppressing or minimizing the current on the substrate surface and limiting electrochemical deposition and dissolution. Examples of corrosion inhibitors used herein may include any various organic compounds containing an azole group, such as benzotriazole, mercaptobenzotriazole, or 5-methyl-1-benzotriazole. It is believed that the azole groups, such as triazole, are effective inhibitors because the unbonded electron pair on the nitrogen atom can form coordinate covalent bonds with the conductive materials, such as copper, and become resistant to further chemical activity. Corrosion inhibitors are preferred additives to the electrolyte since corrosion inhibitors form passivation layers without oxide formation.

The corrosion inhibitors may be present in an amount up to the saturation point of the solution, i.e., without precipitating out into the electrolyte solution. A concentration of corrosion inhibitor between about 0.005 vol % and about 10 vol % of the electrolyte solution can be used. For example, a concentration of corrosion inhibitor between about 0.05 vol % and about 2 vol % may be used in the electrolyte solution.

Leveling agents are broadly defined herein as additives that suppress dissolution current on the surface of a substrate. Examples of leveling agents include, but are not limited to, polyethylene glycol and polyethylene glycol derivatives. Other leveling agents which can be employed in the process described herein include any of those employed in the electroplating art, such as polyamines, polyamides and polyimides including polyethyleneimine, polyglycine, 2-amino-1-naphthalenesulfonic acid, 3-amino-1-propanesulfonic acid, 4-aminotoluene-2-sulfonic acid.

It is believed that leveling agents suppress dissolution current by attaching to conductive materials by inhibiting the electrochemical reactions reaction between the electrolyte and conductive material and/or form depolarizing agents that limit electrochemical reactions. The invention also contemplates the use of other conventionally known or commercially available corrosion inhibitors and leveling compounds typically used in electroplating deposition to suppress current on the wafer surface used in polishing substrate surfaces.

The leveling agents can be present in an amount up to the saturation point of the solution, i.e., without precipitating out into the electrolyte solution. A concentration of leveling agents between about 0.005 vol % and about 10 vol % of the electrolyte solution can be used. For example, a concentration of leveling agents between about 0.05 vol % and about 2 vol % may be used in the electrolyte solution.

Viscous forming agents that form passivation or suppressing deposits on the surface of the substrate may be included in the electrolyte solution. For example, phosphate-based compounds or a phosphorus acid based compounds including electrolyte agents, such as phosphoric acid, copper phosphate, or potassium phosphate, or phosphorous doped anodes, produce ions which can form viscous deposits or layers on at least a portion of the substrate surface. The viscous deposits or layers passivate or suppress current passing through the substrate surface and limit electrochemical activities, such as anodic dissolution of material from the substrate surface. The above provided corrosion inhibitors, levelers, and viscous forming agents are illustrative, and the invention contemplates the use of additional material, however designated, which may form a passivation layer or suppress.

The electrolyte solution may further include one or more electrolyte additives, such as brighteners, enhancers, and/or surfactants that adsorb onto the surface of the substrate. The additives may be present in the electrolyte solution up to about 15% by weight in volume of total solution. Useful additives include one or more chelating agents having amine groups, amide groups, carboxylate groups, dicarboxylate groups, tri-carboxylate groups, or combinations thereof. For example, the chelating agents may include tetraethylenepentamine, triethylenetetramine, diethylenetriamine, ethylenediamine, amino acids, ammonium oxalate, ammonia, ammonium citrate, citric acid, and ammonium succinate.

Examples of electrolyte solution include BTA, a corrosion inhibitor, being added to the electrolyte composition 220 in amounts of about 0.01 to about 2 percent by weight in volume of total solution, and ammonium citrate, a chelating agent, added to the electrolyte solution in amounts of about 0.1 to about 15 percent by weight in volume of total solution. In another aspect, BTA is added in amounts of about 0.05 to about 0.5 percent by weight in volume of total solution, and ammonium citrate is added in amounts ranging from about 7 to about 10 percent by weight in volume of total solution. In yet another aspect, BTA is added to the electrolyte composition 220 in amounts of about 0.01 to about 2 percent by weight in volume of total solution, and ethylenediamine (EDA) is added to the electrolyte solution in amounts of about 2 to about 15 percent by weight in volume of total solution.

The electrolyte solution may also include abrasive particles up to about 35 wt. % or less of the electrolyte to enhance mechanical abrasion of the substrate surface during processing. For example, a concentration of about 2 wt. % or less of abrasive particles may be included in the electrolyte. Abrasive particles that may be used in the electrolyte include, but are not limited to, silica, alumina, zirconium oxide, titanium oxide, cerium oxide, or any other abrasives known in the art, and have an average size between about 20 nm and about 300 nm.

In operation, the substrate is polished in the electrolyte solution with the permeable disk removing at least a portion of a passivation layer from the substrate surface at step 1320. At least a portion of the substrate surface is contacted to the permeable disk 428 during at least a portion of the process to provide mechanical interaction with the substrate surface. For example, the substrate and the permeable disk are moved in relative motion to one another, such as in a relative orbital motion, to mechanically remove at least a portion of the passivation layer formed on the substrate surface to expose the underlying conductive material. The polishing step may also remove a portion of copper-containing material disposed on the substrate surface in contact with the permeable disk 428.

A polishing pressure of about 6 psi or less between the permeable disk 428 and the substrate surface is used to remove the passivation layer and copper-containing material from the substrate surface. In one aspect, a polishing pressure of about 2 psi or less is used to remove the passivation layer (and copper-containing material) for the electrochemical mechanical polishing (ECMP) technique to planarize the substrate surface. For polishing low k materials, such as silicon oxycarbide and low k porous materials, a polishing pressure of about 1.5 psi or less, such as about 0.5 psi, may be used. In one embodiment of the process, at pressures of about 6 psi or less, corrosion inhibitors, leveling agents, or combinations thereof, may be used at polishing pressures of about 6 psi or less. Leveling agents may be used when the polishing pressures is about 2 psi or less.

Alternatively, material may be removed from the surface of the substrate without the application of any pressure between the substrate and the permeable disk, i.e., the polishing pressure may be about 0 psi, such as by anodic dissolution of a surface with a discontinuous passivation layer formed thereon.

The substrate may be rotated at a carrier head or polishing head rotational speed of about 10 rpms or greater during polishing. For example, a rotational speed of the polishing head may be between about 10 rpms and about 500 rpms, with a rotational speed between about 10 rpms and about 100 rpms most commonly used. The invention contemplates a polishing apparatus providing a rotational rate greater than 120 rpms and less than 500 rpms. The platen may also be rotated at between about 10 rpms and about 500 rpms. A platen rotational speed between about 10 rpms and about 100 rpms may be used with the processes described herein.

Anodic dissolution of the conductive material is initiated by applying a bias between the substrate, or anode, and cathode disposed in the electrolyte to allow dissolution of conductive material 1250, such as copper-containing materials formed thereon at step 1330. The bias may include the application of a voltage of about 15 volts or less to the substrate surface. A voltage between about 0.1 volts and about 15 volts may be used to dissolve copper-containing material from the substrate surface and into the electrolyte. Under such a bias, the substrate surface acts as an anode for the dissolution of material formed thereon. Alternatively, the bias may be a current density between about 0.01 and about 40 milliamps/cm$^2$ for a 200 mm substrate. Alternatively, the bias may be applied to the permeable disk 428, which may be a conductive polymeric pad to electrically conduct current or power to the substrate surface during processing.

The bias applied to perform the anodic dissolution process may be varied in power and application depending on the user requirements in removing material from the substrate surface. For example, a time varying anodic potential may be provided to the substrate surface. The bias may also be applied by electrical pulse modulation techniques. The electrical pulse modification technique comprises applying a constant current density or voltage over the substrate for a first time period, than applying a constant reverse voltage over the substrate for a second time period, and repeating the first and second steps. The electrical pulse modification technique may use a varying potential from between about −0.1 volts and about −15 volts to between about 0.1 volts and about 15 volts. Alternatively, the bias may be a current density between about 0.01 and about 40 milliamps/cm$^2$ for a 200 mm substrate. Electrical pulses may be varied at intervals between of less than 3 seconds, for example, between about 0.2 second and 0.4 second or between 5 milliseconds and 100 milliseconds.

The pulse plating technique allows for both electrodeposition as well as anodic dissolution during processing. For the electrochemical mechanical polishing process described herein, the pulse plating technique is adapted to minimize any electrodeposition of conductive materials. Examples of pulse plating techniques are further disclosed in co-pending U.S. patent application Ser. No. 09/916,365, entitled, "Dynamic Pulse Plating For High Aspect Ratio Features", filed on Jul. 26, 2001, co-pending U.S. patent application Ser. No. 09/569,833, entitled, "Electrochemical Deposition For High Aspect Ratio Structures Using Electrical Pulse Modulation", filed on May 11, 2000, and U.S. patent application Ser. No. 09/602,644, entitled, "Method For Electrochemical Deposition Of Metal Using Modulated Waveforms", filed on Jun. 22, 2000.

Material is removed from at least a portion of the substrate surface by anodic dissolution, mechanical abrasion, or combinations thereof, as described above, at step 1340. The bias is applied to the substrate surface to remove copper containing material at a rate of about 15,000 Å/min, such as between about 100 Å/min and about 15,000 Å/min. In one embodiment of the invention where the copper material to be removed is less than 5,000 Å thick, the voltage may be applied to provide a removal rate between about 100 Å/min and about 5,000 Å/min.

An example of the polishing process includes positioning a substrate having copper-containing material disposed thereon in a substrate carrier assembly 430, and then positioning the substrate in the partial enclosure 434. The enclosure 434 contains 0.85 molar (M) copper sulfate electrolyte solution including about 0.01 vol % of benzotriazole as the corrosion inhibitor. A polishing speed between about 10 rpms and about 100 rpms and a contact pressure of about 1 psi between the substrate and the permeable disk 428 is provided. A bias between about 1.5 volts and about 2 volts is applied to the substrate surface or conductive polishing pad. The copper-containing material is moved at a rate between about 50 Å/min and about 5000 Å/min.

In an alternative embodiment, the passivation layer may be formed ex situ to the electrochemical processing cell. In ex situ formation of the passivation layer, the substrate is transferred to a processing chamber or bath, and a layer of passivating materials is deposited on the substrate surface. The substrate may then be positioned in an electrolyte solution, and a bias may be applied and the surface polished according to the process described herein. The passivating material may be a dielectric material, such as silicon dioxide, or organic materials, such as insulating polymers, such as parylene base polymers used in semiconductor manufacturing. Materials that may be polished at polishing pressures of about 1 psi or less may be used in the process described herein. The passivating material is deposited to a thickness between about 5 Å and about 100 Å.

While the exact mechanism for planarizing the substrate is unknown, it is believed that the planarization process is as follows. A passivation layer which chemically and/or electrically insulates the surface of the substrate is formed from the exposure of the substrate surface to the corrosion inhibitor, leveling agent, or viscous forming agent, or combinations thereof, or by the deposition of a dielectric layer or organic material. A bias is applied to remove material or enhance removal of conductive material, such as copper-containing material, from the substrate surface by anodic dissolution. However, since the passivation layer insulates or suppresses the current for anodic dissolution, mechanical abrasion is provided between the substrate and permeable disk to remove the passivation layer from areas of contact between the permeable disk and the substrate, such as from peaks formed on the substrate surface from excessive deposition or topography of underlying layers, and expose the underlying copper-containing material. The passivation layer is retained in areas of minimal or no contact, such as recesses or valleys in the substrate surface. The exposed copper-containing material is then electrically connected with the electrolyte solution and may be removed by anodic dissolution.

The selective removal of the passivation layer from peaks by contact with the permeable disk 428 under the applied bias while retaining the passivation layer in valleys, allows for increased dissolution and/or removal of excessive copper-containing materials from passivation-free portions of the substrate surface in relation to the removal of the conductive materials underlying the passivation layer. The increased dissolution and removal of the copper-containing materials without a passivation layer formed thereon allows for increased reduction of the peaks formed on the substrate surface compared to the valleys formed thereon, resulting in enhanced planarization of the substrate surface.

Additionally, removal of material by polishing and anodic dissolution allows for the substrate surface to be planarized with lower polishing pressures (i.e., about 2 psi or less) than conventional polishing. Lower polishing pressures correspond to lower shear forces and frictional forces which make this process suitable for planarizing substrate surfaces sensitive to contact pressures between the substrate and polishing pads, such as polishing low k dielectric materials, with reduced or minimal deformations and defect formation from polishing. Further, the lower shear forces and frictional forces has been observed to reduce or minimize formation of topographical defects, such as dishing and scratches, during polishing.

While the above described embodiments are directed to polishing a copper material, including copper alloys and doped copper, from a substrate, the invention contemplates application of the process described herein for polishing surfaces that may contain conductive metals, such as aluminum, tungsten, tantalum, titanium, nitrides of tungsten, tantalum, and titanium, alloys of aluminum, tungsten, tantalum, and titanium, doped aluminum, doped tungsten, doped tantalum, and doped titanium, and combinations thereof, and other materials that may deposited and/or removed by electrochemical processes, such as platinum, gold, silver, nickel and combinations thereof.

Figure 13A:
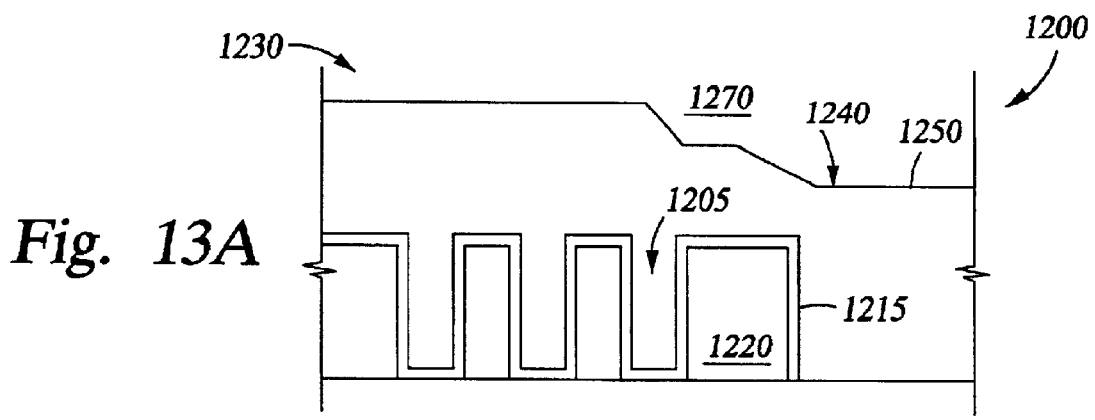
FIGS. 13A–13F are schematic diagrams of polishing a substrate according to one embodiment for planarizing a substrate surface described herein.

FIGS. 13A–13F are schematic cross-sectional views of a substrate surface 1200 during one embodiment of the process described in steps 1300–1340 above. Referring to FIG. 13A, the substrate surface 1200 typically includes a dielectric layer 1220 with features 1205 formed therein, a barrier layer 1215 conformally disposed on surfaces of the features 1205, an optional copper seed layer deposited on the barrier layer (not shown), and a conductive material disposed thereon. The conductive material 1250, such as copper, is electrochemically deposited in the features 1205 in this example.

Figure 13B:
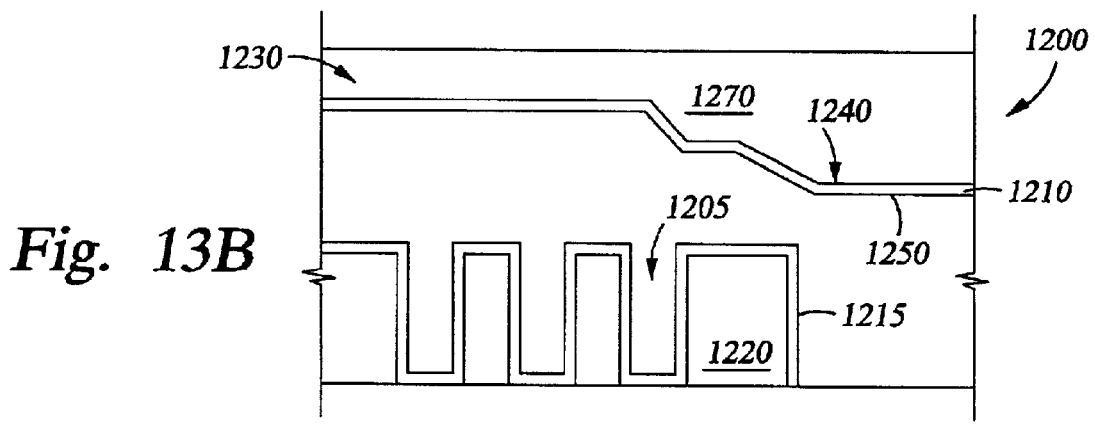

Referring to FIG. 13B, exposure of the substrate surface 1200 to the corrosion inhibitor allows the formation of a passivation layer 1210 on the substrate surface 1200 in the electrolyte solution 1270. The passivation layer 1210 generally forms on the exposed copper material 1250, on the substrate surface 1200 including the peaks 1230 and valleys 1240 that may form in the deposited copper material 1250.

Figure 13C:
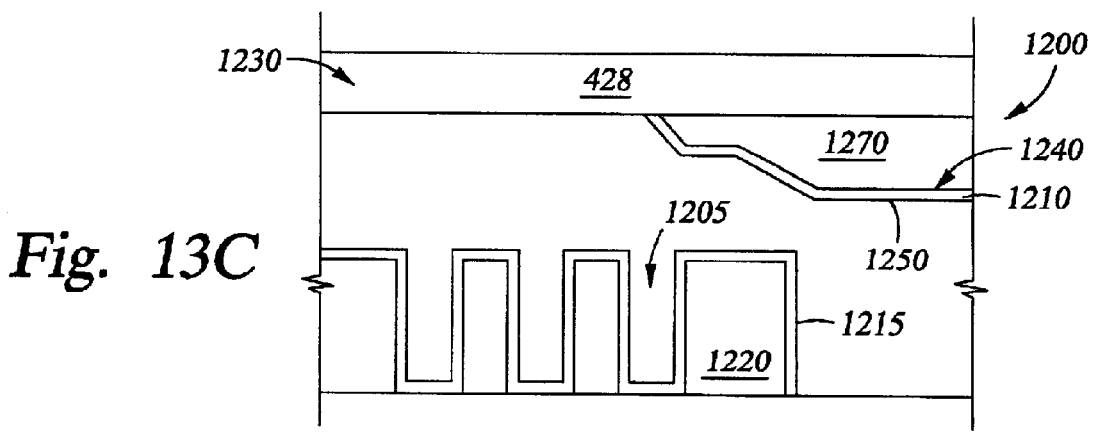
Figure 13D:
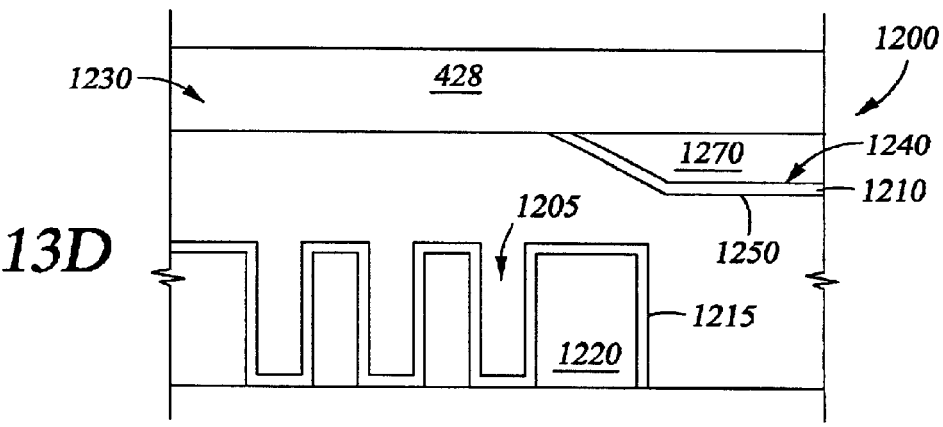

Referring to FIGS. 13C and 13D, the substrate and the permeable disk 428 are contacted with one another and moved in relative motion to one another, such as in a relative orbital motion, to remove the passivation layer 1210 formed on the exposed conductive material 1250 of the substrate surface 1200. The contact between the substrate and the permeable disk 428 allows for the mechanical removal of the passivation layer 1210 and subsequent removal of at least a portion of the copper material 1250. A bias is applied to the substrate surface during contact between the substrate and the permeable disk 428 allows for anodic dissolution of the copper material 1250. The removal rate of the copper material 1250 covered by the passivation layer is less than the removal rate of copper with the passivation layer polished away, allowing the removal of the polished material in a planar manner as shown in FIG. 13D.

Figure 13E:
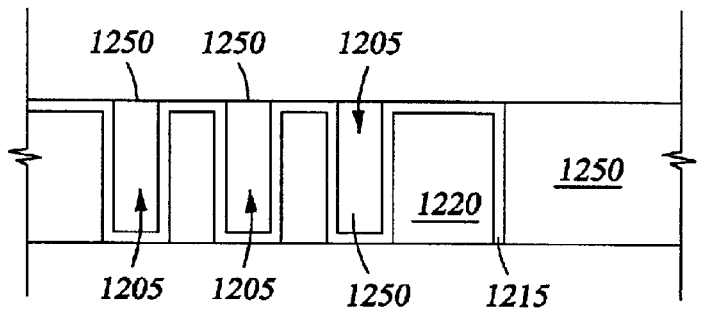
Figure 13F:
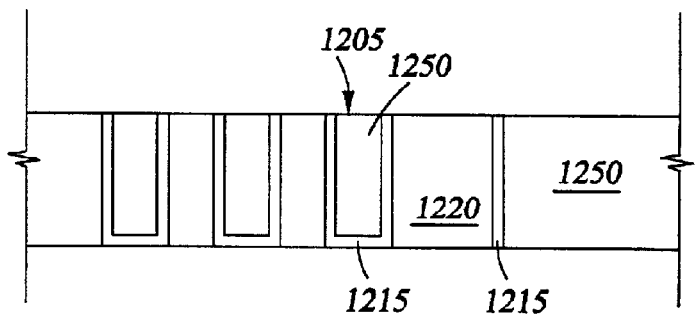

Referring to FIG. 13E, the polishing between the substrate and anodic dissolution by the applied bias is continued until the barrier layer 1215 is reached. The copper material 1250 is retained in the filled feature 1205. The barrier layer may then be planarized by a barrier polishing process as shown in FIG. 13F.

Following the depositing and planarizing process, the substrate may then be transferred to a polishing apparatus for further planarization of the substrate. In one aspect of the invention, a substrate that has been deposited and polished as described above is transferred to a first platen, and residual or remaining deposited material, such as copper, is removed from the substrate surface. Residual material is broadly defined as any bulk material remaining after one or more polishing process steps has been performed on the substrate. Residual material may include copper containing material, such as copper, copper alloys, and/or doped copper as well as copper polishing by-products, such as copper oxides, removed from the substrate surface. Residual may partially or completely cover the surface a substrate, for example, a portion of the underlying barrier layer may be exposed when residual material is retained after a polishing step, or alternatively, no barrier layer may be exposed after a polishing process has been performed.

In one example, substrate is positioned on a first platen containing a fixed abrasive polishing pad, and typically includes positioning the substrate on the fixed abrasive polishing pad at polishing station (not shown). The polishing process may use an abrasive free or abrasive containing polishing composition on a conventional or fixed abrasive polishing pad described above.

The substrate may then be positioned for barrier removal on a second platen containing a polishing pad, which typically includes positioning a substrate on abrasive-free polishing pad disposed on a platen in a polishing station. A barrier removal polishing composition is then supplied to the polishing pad and barrier layer materials are then removed from the surface of the substrate by a polishing process on the substrate. The barrier removal polishing composition may be an abrasive free composition on a conventional of fixed abrasive pad or may include high-speed chemical etching, also known as spin-etch.

The substrate may then be positioned on a third platen in a third polishing station for a buffing process to minimize surface defects. Buffing may be performed with a soft polishing pad, i.e., a hardness of about 40 or less on the Shore D hardness scale as described and measured by the American Society for Testing and Materials (ASTM), headquartered in Philadelphia, Pa., at reduced polishing pressures, such as about 2 psi or less. An example of a suitable buffing process and composition is disclosed in co-pending U.S. patent application Ser. No. 09/569,968, filed on May 11, 2000, and incorporated herein by reference to the extent not inconsistent with the invention.

Optionally, a cleaning solution may be applied to the polishing pad during or subsequent each of the polishing process to remove particulate matter and spent reagents from the polishing process as well as help minimize metal residue deposition on the polishing pads and defects formed on a substrate surface. An example of a suitable cleaning solution is ElectraClean™ commercially available from Applied Materials, Inc., of Santa Clara, Calif.

Finally, the substrate may be exposed to a post polishing cleaning process to reduce defects formed during polishing or substrate handling. Such processes can minimize undesired oxidation or other defects in copper features formed on a substrate surface. An example of such a post polishing cleaning is the application of Electra Clean™, commercially available from Applied Materials, Inc., of Santa Clara, Calif.

While foregoing is directed to various embodiments of the invention, other and further embodiments of the invention may be devised without departing from the basic scope thereof, and the scope thereof is determined by the claims that follow.

What is claimed is:

1. A method of processing a substrate, comprising:
   exposing the substrate to a phosphoric acid based electrolyte solution, wherein the phosphoric acid based electrolyte solution further comprises a corrosion inhibitor and a chelating agent;
   forming a passivation layer on a substrate surface;
   contacting the substrate surface with a polishing article in the electrolyte solution;
   applying an anodic bias to the substrate surface; and
   removing material from at least a portion of the substrate surface.

2. The method of claim 1, wherein the passivation layer is a current suppressing layer.

3. The method of claim 2, wherein the corrosion inhibitor comprises an organic compound containing an azole group selected from the group consisting of benzotriazole, mercaptobenzotriazole, 5-methyl-1-benzotriazole, and combinations thereof.

4. The method of claim 1, wherein the phosphoric acid based electrolyte solution further comprises a leveling agent selected from the group consisting of polyethylene glycol, polyethylene glycol derivatives, and combinations thereof.

5. The method of claim 1, wherein the passivation layer is formed by a viscous forming agent.

6. The method of claim 5, wherein the viscous forming agent comprises a phosphate-based compound or a phosphorus acid based compound.

7. The method of claim 6, wherein the viscous forming agent comprises phosphoric acid, copper phosphate, or potassium phosphate.

8. The method of claim 1, further comprising providing relative motion between the subtrate and the polishing article when contacting the subtrate with the polishing article.

9. The method of claim 1, wherein applying the anodic bias to the substrate surface comprises biasing the polishing article and contacting the substrate to the polishing article.

10. The method of claim 1, wherein the phosphoric acid based electrolyte solution comprises phosphoric acid or phosphoric acid based electrolyte derivatives.

11. The method of claim 1, wherein the phosphoric acid based electrolyte solution further comprises abrasive particles.

12. The method of claim 1, wherein applying the bias to the substrate comprises applying a voltage between about 0.1 volts and about 15 volts.

13. The method of claim 1, wherein the polishing article exerts a pressure on the substrate of about 2 psi or less during polishing.

14. The method of claim 1, wherein the corrosion inhibitor, leveling agent, or combinations thereof, comprise between about 0.005 vol % and about 10 vol % of the electrolyte.

15. A method of processing a substrate, comprising:
positioning the substrate in a phosphoric acid based electrolyte solution adjacent a polishing article;
exposing the substrate to a corrosion inhibitor and a chelating agent disposed in the phosphoric acid based electrolyte solution;
forming a current suppressing layer on a substrate surface;
contacting the substrate in the electrolyte solution with the polishing article to remove at least a portion of the current suppressing layer;
applying a bias between the polishing article contacting the substrate and a cathode disposed in the electrolyte solution; and
removing material from at least a portion of the substrate surface with an anodic dissolution process.

16. The method of claim 15, wherein applying the bias comprises controllably applying a time varying anodic potential to the substrate surface.

17. The method of claim 15, wherein the bias applied between the anode and the cathode is between about 0.1 volts and about 15 volts.

18. The method of claim 15, wherein the phosphoric acid based electrolyte solution comprises phosphoric acid or phosphoric acid based electrolyte derivatives.

19. The method of claim 15, wherein the corrosion inhibitor comprises an organic compound containing an azole group selected from the group consisting of benzotriazole, mercaptobenzotriazole, 5-methyl-1-benzotriazole, and combinations thereof.

20. The method of claim 15, wherein the phosphoric acid based electrolyte solution further comprises a leveling agent selected from the group consisting of polyethylene glycol, polyethylene glycol derivatives, and combinations thereof.

21. The method of claim 15, further comprising providing relative motion between the substrate and the polishing article when contacting the substrate with the polishing article.

22. The method of claim 21, applying the bias comprises controllably applying a time varying anodic potential to the substrate surface.

23. The method of claim 15, wherein the corrosion inhibitor comprises between about 0.005 vol % and about 10 vol % of the electrolyte solution.

24. The method of claim 15, wherein the electrolyte solution further comprises abrasive particles.

25. A method of processing a substrate, comprising:
positioning the substrate in an electrolyte solution adjacent a polishing article, wherein a portion of a substrate surface comprises a conductive material and the electrolyte solution comprises:
phosphoric acid based electrolyte;
one more corrosion, inhibitors selected from the group consisting of benzotriazole, mercaptobenzotriazole, 5-methyl-1-benzotriazole; and
one or more chelating agents selected from the group consisting of tetraethylenepentamine, triethylenetetramine, diethylenetriamine, ethylenediamine, amino acids, ammonium oxalate, ammonia, ammonium citrate, citric acid, and ammonium succinate;
forming a current suppressing layer;
contacting the substrate in the electrolyte solution with the polishing article to remove at least a portion of the current suppressing layer and expose of portion of the conductive material;
applying a bias between an anode and a cathode disposed in the electrolyte solution; and
removing material from the exposed portion of the conductive material by anodic dissolution and mechanical contact with the polishing article.

26. The method of claim 25, further comprising providing relative motion between the substrate and the polishing article when contacting the substrate with the polishing article.

27. The method of claim 26, wherein applying the bias comprises controllably applying a time varying anodic potential to the substrate surface.

28. The method of claim 27, further comprising a leveling agent selected from the group consisting of polyethylene glycol, polyethylene glycol derivatives, and combinations thereof.

29. The method of claim 28, wherein the corrosion inhibitor, comprises between about 0.005 vol % and about 10 vol % of the electrolyte.

30. The method of claim 25, wherein the electrolyte further comprises abrasive particles.

31. A method of processing a substrate, comprising:
introducing a substrate into a phosohoric acid based electrolyte;
forming a passivation layer on a substrate surface by exposing a substrate surface to one or more corrosion inhibitors and one or more chelating agents disposed in the phosphoric acid based electrolyte;
contacting a polishing article with the substrate in the electrolyte solution;
applying an anodic bias to the substrate surface by biasing the polishing article; and
removing material from at least a portion of the substrate surface.

32. The method of claim 31, wherein the electroyte, comprises phosphoric acid or phosphoric acid based electrolyte derivatives.

33. The method of claim 32, wherein the one or more corrosion inhibitors comprises an organic compound containing an azole group selected from the group consisting of benzotriazole, mercaptobenzotriazole, 5-methyl-1-benzotriazole, and combinations thereof.

34. The method of claim 33, wherein the one or more chelating agents are selected from the group consisting of tetraethylenepentamine, triethylenetetramine, diethylenetriamine, ethlylenediamine, amino acids, ammonium oxalate, ammonia, ammonium citrate, citric acid, and ammonium succinate.

35. The method of claim 34, wherein the electrolyte further comprises a leveling agent selected from the group of polyethylene glycol, polyethylene glycol derivatives, and combinations.

36. The method of claim 34, wherein the electrolyte further comprises abrasive particles.

* * * * *

UNITED STATES PATENT AND TRADEMARK OFFICE
CERTIFICATE OF CORRECTION

| | |
|---|---|
| PATENT NO. | : 6,811,680 B2 |
| APPLICATION NO. | : 10/038066 |
| DATED | : November 2, 2004 |
| INVENTOR(S) | : Liang-Yuh Chen et al. |

It is certified that error appears in the above-identified patent and that said Letters Patent is hereby corrected as shown below:

In the Specification

Column 3, Line 32: Before "cathode", change "an" to --a--

Column 3, Line 52: After "more", insert --polishing platens.--

Column 9, Line 35: After "example", change the comma to a period

Column 10, Line 64: Change "40" to --440--

Column 10, Line 64: Change "42" to --442--

Column 12, Line 2: Change "46" to --446--

Column 14, Lines 44 and 46: Change each instance of "detente" to --détente--

Column 18, Line 3: Before "polished", insert --be--

Column 21, Line 21: Change "ethlylenediamine" to --ethylenediamine--

Column 22, Line 11: Change "pressures" to --pressure--

Column 22, Lines 25-26: Delete the paragraph break after "500"

Column 22, Line 62: After "intervals", delete "between"

UNITED STATES PATENT AND TRADEMARK OFFICE
CERTIFICATE OF CORRECTION

PATENT NO. : 6,811,680 B2
APPLICATION NO. : 10/038066
DATED : November 2, 2004
INVENTOR(S) : Liang-Yuh Chen et al.

It is certified that error appears in the above-identified patent and that said Letters Patent is hereby corrected as shown below:

<u>In the Claims</u>

Column 26, Claim 8, Lines 50 and 51: Change each instance of "subtrate" to --substrate--

Column 27, Claim 22, Line 43: Before "applying", insert --wherein--

Column 27, Claim 25, Line 57: Delete the comma after "corrosion"

Column 27, Claim 25, Line 63: Change "ethlylenediamine" to --ethylenediamine--

Column 28, Claim 29, Line 25: Delete the comma after "inhibitor"

Column 28, Claim 32, Line 43: Change "electroyte" to --electrolyte--

Column 28, Claim 32, Line 43: Delete the comma at the end of the line

Column 28, Claim 34, Line 54: Chnge "ethlylenediamine" to --ethylenediamine--

Column 28, Claim 35, Line 58: After "group", insert --consisting--

Column 28, Claim 35, Line 60: After "combinations", insert --thereof--

Signed and Sealed this

Fifth Day of September, 2006

JON W. DUDAS
*Director of the United States Patent and Trademark Office*